US011910230B2

(12) United States Patent
Hong

(10) Patent No.: US 11,910,230 B2
(45) Date of Patent: Feb. 20, 2024

(54) METHOD FOR PROCESSING DATA IN RELAY NODE, AND DEVICE THEREFOR

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/051,023

(22) PCT Filed: Jul. 25, 2019

(86) PCT No.: PCT/KR2019/009217
§ 371 (c)(1),
(2) Date: Oct. 27, 2020

(87) PCT Pub. No.: WO2020/027491
PCT Pub. Date: Feb. 6, 2020

(65) Prior Publication Data
US 2021/0127293 A1    Apr. 29, 2021

(30) Foreign Application Priority Data

Jul. 30, 2018  (KR) ........................ 10-2018-0088513
Apr. 19, 2019  (KR) ........................ 10-2019-0046076
Jul. 22, 2019  (KR) ........................ 10-2019-0088142

(51) Int. Cl.
*H04W 28/02* (2009.01)
*H04W 88/14* (2009.01)
(Continued)

(52) U.S. Cl.
CPC ........... *H04W 28/04* (2013.01); *H04L 1/0007* (2013.01); *H04W 24/08* (2013.01);
(Continued)

(58) Field of Classification Search
CPC ............ H04L 1/0007; H04W 28/0278; H04W 28/0289; H04W 28/04; H04W 72/042;
(Continued)

(56) References Cited

U.S. PATENT DOCUMENTS

2011/0242972 A1    10/2011  Sebire et al.
2011/0261747 A1    10/2011  Wang et al.
(Continued)

OTHER PUBLICATIONS

3GPP TS 38.425, Technical Specification Group Radio Access Network; NG-RAN; NR user plane protocol (Release 15) (Year: 2018).*
(Continued)

*Primary Examiner* — Harun Chowdhury
(74) *Attorney, Agent, or Firm* — IP Legal Services, LLC

(57) ABSTRACT

Provided are methods and apparatuses of processing data in an integrated access and backhaul (IAB) node using new radio (NR) wireless communication technology. The method of an integrated access and backhaul (IAB) node processes data, includes: configuring a mobile-termination (MT) function and a distribute unit function of the IAB node; monitoring an uplink buffer state or a downlink buffer state in the IAB node; and transmitting downlink buffer state information or uplink buffer state information to the donor base station or an associated parent IAB node on the basis of a monitoring result of the uplink buffer state or the downlink buffer state.

2 Claims, 17 Drawing Sheets

(51) Int. Cl.
  *H04W 28/04* (2009.01)
  *H04W 76/11* (2018.01)
  *H04L 1/00* (2006.01)
  *H04W 24/08* (2009.01)
  *H04W 80/02* (2009.01)

(52) U.S. Cl.
  CPC ........ *H04W 28/0278* (2013.01); *H04W 76/11* (2018.02); *H04W 80/02* (2013.01); *H04W 88/14* (2013.01)

(58) Field of Classification Search
  CPC ..... H04W 80/02; H04W 88/14; H04W 28/16; H04W 28/0268
  USPC ................................. 370/229, 252, 328, 329
  See application file for complete search history.

(56) References Cited

U.S. PATENT DOCUMENTS

| | | |
|---|---|---|
| 2013/0094455 A1 | 4/2013 | Wu et al. |
| 2014/0078965 A1 | 3/2014 | Wu et al. |
| 2014/0161024 A1 | 6/2014 | Speight et al. |
| 2014/0226558 A1 | 8/2014 | Speight et al. |
| 2015/0341937 A1 | 11/2015 | Speight et al. |
| 2016/0029289 A1 | 1/2016 | Wang et al. |
| 2017/0055252 A1 | 2/2017 | Speight et al. |
| 2017/0135112 A1 | 5/2017 | Speight et al. |
| 2018/0027474 A1 | 1/2018 | Wang et al. |
| 2019/0297555 A1* | 9/2019 | Hampel ............ H04W 28/0289 |
| 2019/0357247 A1* | 11/2019 | Keskitalo .......... H04W 28/0278 |
| 2020/0037200 A1* | 1/2020 | Cho ...................... H04W 80/02 |
| 2021/0007011 A1* | 1/2021 | Zhu .................. H04W 28/0278 |
| 2021/0099914 A1* | 4/2021 | Wei ..................... H04W 72/042 |
| 2021/0243672 A1* | 8/2021 | Deshmukh ............ H04W 88/14 |
| 2021/0282050 A1* | 9/2021 | Adjakple ............. H04W 88/14 |

OTHER PUBLICATIONS

Huawei, "TP of IAB node access procedure for architecture group 1", R3-184313, 3GPP TSG-RAN WG3 #Ad Hoc 1807, Montreal, Canada, Jul. 2-6, 2018, pp. 1-5.

Nokia et al., "Architecture and Protocols: MAC adaptation layer based IAB", R3-182103, 3GPP TSG-RAN WG3 Meeting #99bis, Sanya, China, Apr. 16-20, 2018, pp. 1-6.

Huawei et al., "Adaptation layer design", R2-1810675, 3GPP TSG-RAN WG2 Ad Hoc, Montreal, Canada, Jul. 2-6, 2018, pp. 1-5.

3GPP, "3rd Generation Partnership Project; Technical Specification Group Radio Access Network; Study on Integrated Access and Backhaul; (Release 15)", 3GPP TR 38.874 V0.2.1, May 2018, pp. 1-19.

Huawei et al., "Topology type, discovery and update for IAB", R2-1808668, 3GPP TSG-RAN WG2 Meeting #102, Busan, Korea, May 21-25, 2018, pp. 1-5.

* cited by examiner

METHOD FOR PROCESSING DATA IN RELAY NODE, AND DEVICE THEREFOR

CROSS REFERENCE TO RELATED APPLICATIONS

This application is a National Stage Patent Application of PCT International Patent Application No. PCT/KR2019/009217 (filed on Jul. 25, 2019) under 35 U.S.C. § 371, which claims priority to Korean Patent Application Nos. 10-2018-0088513 (filed on Jul. 30, 2018), 10-2019-0046076 (filed on Apr. 19, 2019), and 10-2019-0088142 (filed on Jul. 22, 2019), the teachings of which are incorporated herein in their entireties by reference.

TECHNICAL FIELD

The present disclosure relates to methods and apparatuses of processing data in an integrated access and backhaul (IAB) node using new radio (NR) wireless communication technology.

BACKGROUND ART

In wireless communication system, are lay technology has been used for expanding a cell coverage using an additional network node.

Accordingly, the relay technology based on the LTE technology supports data delivery on an IP packet level of a relay node. In the LTE system, only a single relay node is deployed for delivering an IP packet between a terminal (e.g., user equipment (WE") and a base station.

That is, the relay technology based on the LTE technology provides only a single hop relay function for providing a simple service and is configured such that most of associated configurations is indicated through static operations, administration and management (OAM). As a result, it is not available to configure a plurality of hop relays.

Further, in the case of supporting a plurality of hop relays based on the LTE technology, it is not possible to process distinguishably respective data through a plurality of relay nodes. There is a problem of delay increasing in signaling and data processing on a higher layer than the IP layer.

Further, in the case of deploying a multi-hop relay, when data processing is delayed or impossible due to any reason in a relay node, a separate control operation is needed for data transmitted and/or received through the relay node. Otherwise, there may occur a problem that data processing is delayed or data is lost due to data congestion in a specific relay node.

However, any method has not been introduced that solves a situation in which data from a current relay node to a specific relay node are heavily congested.

DETAILED DESCRIPTION OF THE INVENTION

Technical Problem

To addresses such issues, in accordance with embodiments of the present disclosure, a method and an apparatus are provided for preventing data from being lost due to data increasing in a relay node (an IAB node).

Technical Solution

In accordance with one aspect of the present disclosure, a method of an integrated access and backhaul (IAB) node is provided for processing data, the method including: receiving IAB node configuration information including information for configuring a mobile-termination (MT) function and a distribute unit function of the IAB node from a donor base station, monitoring an uplink buffer status or a downlink buffer status in the IAB node, and transmitting uplink buffer status information or downlink buffer status information to the donor base station or an associated parent IAB node based on the result of the monitoring for the uplink buffer status or the downlink buffer status.

In accordance with another aspect of the present disclosure, a method of a donor base station is provided for processing data, the method including: transmitting, to an integrated access and backhaul (IAB) node, IAB node configuration information including information for configuring a mobile-termination (MT) function and a distribute unit function of the IAB node, and when a buffer status information transmission is triggered in the IAB node, receiving a F1 user plane protocol header or a F1AP message including downlink buffer status information of the IAB node.

In accordance with further another aspect of the present disclosure, an integrated access and backhaul (IAB) node is provided that processes data, the IAB node including: a receiver receiving IAB node configuration information including information for configuring a mobile-termination (MT) function and a distribute unit function of the IAB node from a donor base station, a controller monitoring an uplink buffer status or a downlink buffer status in the IAB node, and transmitter transmitting uplink buffer status information or downlink buffer status information to the donor base station or an associated parent IAB node based on the result of the monitoring for the uplink buffer status or the downlink buffer status.

In accordance with yet another aspect of the present disclosure, a donor base station is provided that processes data, the donor base station including: a transmitter transmitting, to an integrated access and backhaul (IAB) node, IAB node configuration information including information for configuring a mobile-termination (MT) function and a distribute unit function of the IAB node, and when a buffer status information transmission is triggered in the IAB node, a receiver receiving a F1 user plane protocol header or a F1AP message including downlink buffer status information of the IAB node.

Effects of the Invention

In accordance with embodiments of the present disclosure, it is possible to provide an effect of preventing data from being lost due to data increasing in a relay node (an IAB node).

BEST MODE FOR CARRYING OUT THE INVENTION

Figure 1:
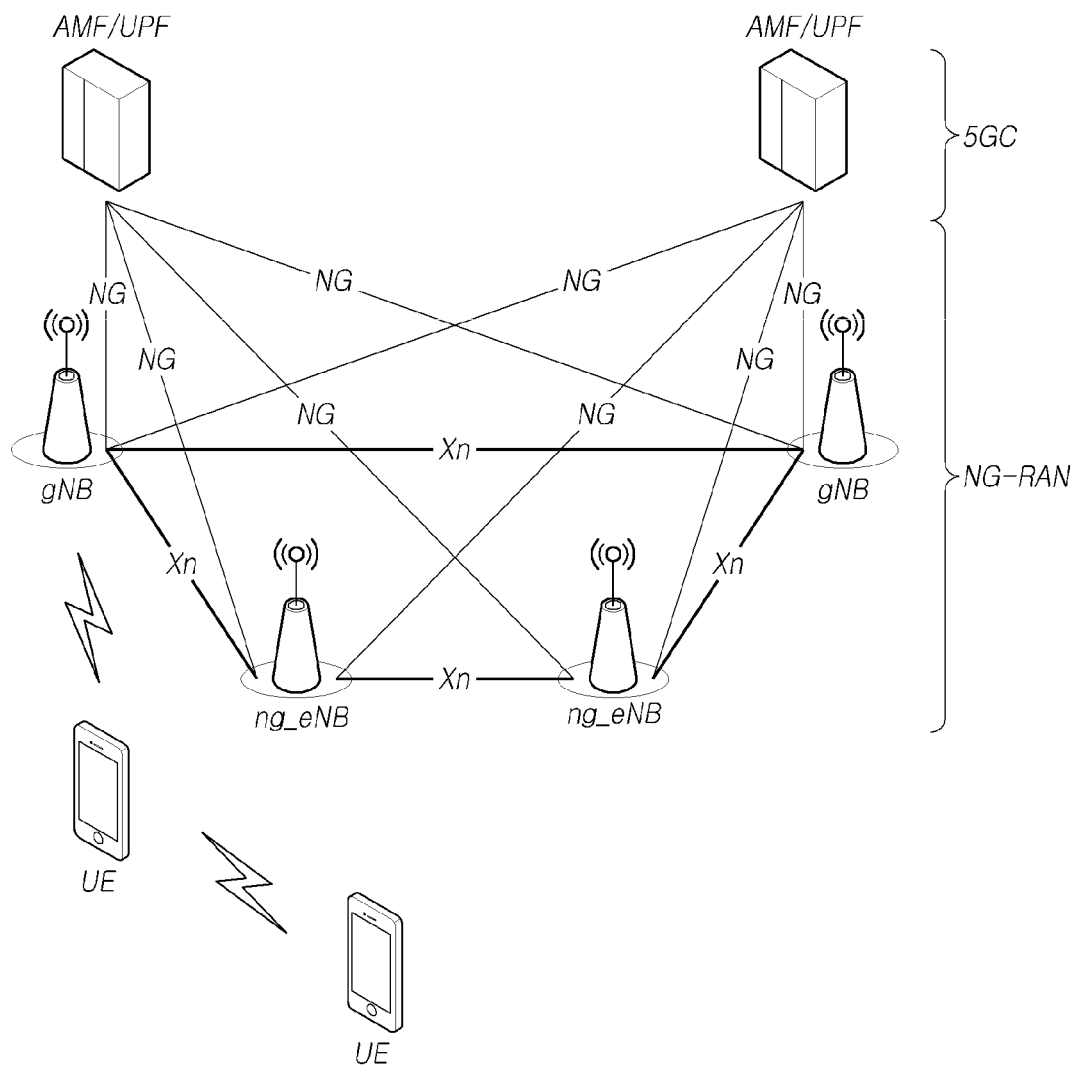
FIG. 1 is a view schematically illustrating an NR wireless communication system to which at least one embodiment is applicable.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/ reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology.

Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR discloses a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 schematically illustrates an NR system to which the present embodiment is applicable.

Referring to FIG. 1, the NR system is divided into a 5G core network (5GC) and an NG-RAN part, and the NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1: FR1) and frequency bands equal to or greater than 6 GHz (frequency range 2: FR2).

The gNB denotes a base station that provides a UE with an NR user plane and control plane protocol end, and the ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP), and, as shown in Table 1 below, "$\mu$" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
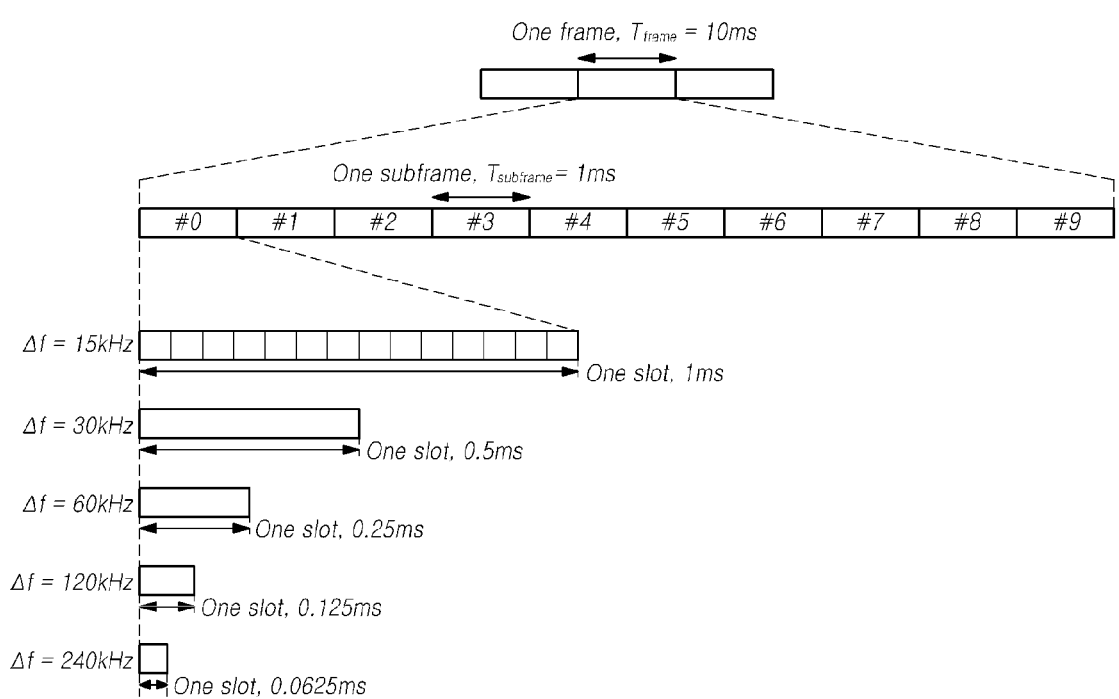
FIG. 2 is a view for explaining a frame structure in an NR system to which at least one embodiment is applicable.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 illustrates a frame structure in an NR system to which the present embodiment may be applied. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
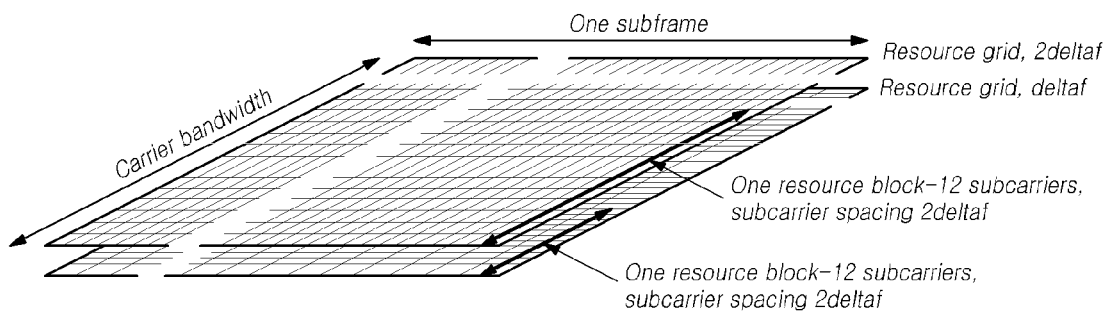
FIG. 3 is a view for explaining resource grids supported by a radio access technology to which at least one embodiment is applicable.

FIG. 3 is a view for explaining resource grids supported by a radio access technology to which the present embodiment is applicable.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
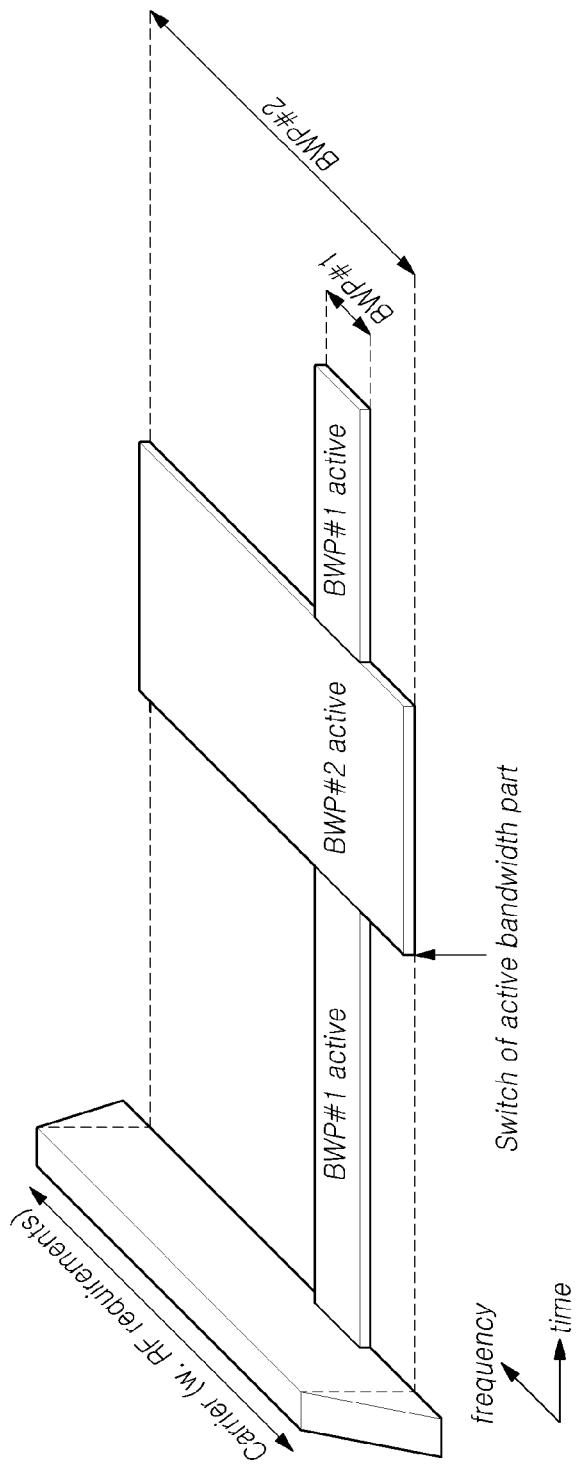
FIG. 4 is a view for explaining bandwidth parts supported by a radio access technology to which at least one embodiment is applicable.

FIG. 4 is a view for explaining bandwidth parts supported by a radio access technology to which the present embodiment is applicable.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink, and the UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs so as to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
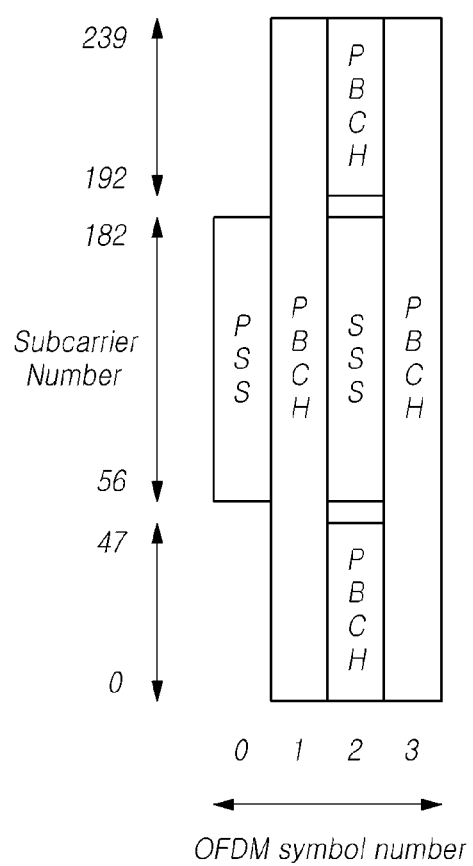
FIG. 5 is a view illustrating an example of a synchronization signal block in a radio access technology to which at least one embodiment is applicable.

FIG. 5 is a view illustrating an example of a synchronization signal block in a radio access technology to which the present embodiment is applicable.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET, and acquires SIB1 on the PDSCH according to scheduling information. The remaining SIBs other than SIB1 may be periodically transmitted, or the remaining SIBs may be transmitted according to the request of the UE.

Figure 6:
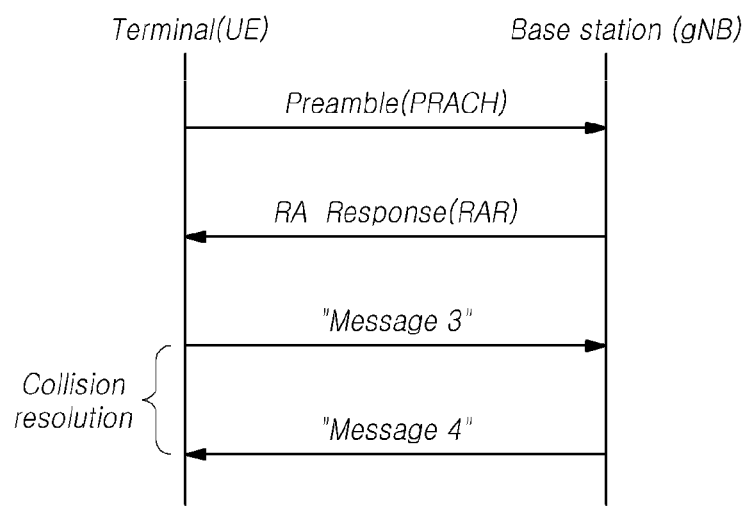
FIG. 6 is a view for explaining a random access procedure in a radio access technology to which at least one embodiment is applicable.

FIG. 6 illustrates a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
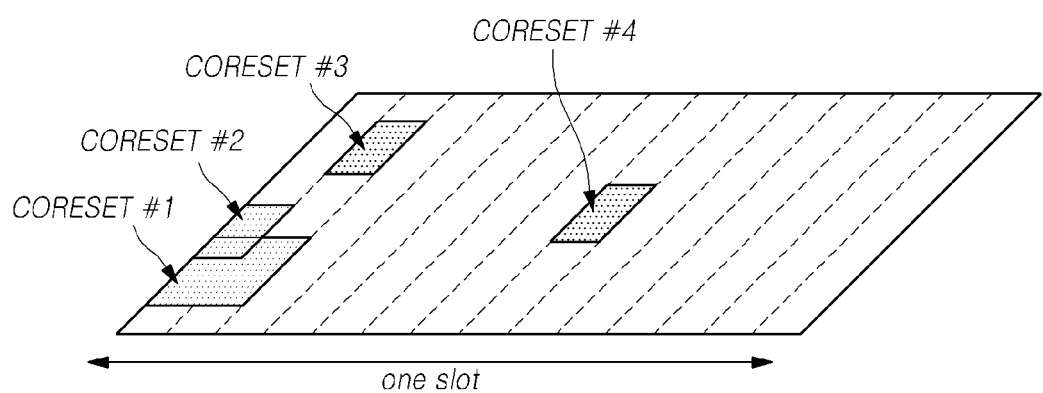
FIG. 7 illustrates CORESET.

FIG. 7 is a view for explaining CORESETs.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

The relay technology in the LTE technology has been used for expanding a cell coverage using an additional network node called a relay node ("RN"). The LTE relay node (RN) performs relaying for user plane data and control plane data at an IP packet level. Further, services are provided through only one RN between a donor base station (a donor eNB, DeNB) that is a base station providing a relay node and a terminal (e.g., a user equipment, UE). That is, relaying through only a single hop is supported between the terminal and the DeNB.

High Layer Functional Split Structure

In order to support an efficient network deployment, a next-generation radio access network (hereinafter, for convenience of description, referred to as "NR", "5G", or "NG-RAN") may be split into a central node (hereinafter, for convenience of description, referred to as a central unit ("CU")) and a distributed node (hereinafter, for convenience of description, referred to as a distributed unit ("DU")), and then be provided based on these separated configurations. That is, a base station maybe split into the CU and the DU and thus, configured based on the CU and the DU from a logical or physical perspective. A base station according to embodiments of the present disclosure, which is a base station to which the NR technology is applied, may be expressed as a gNB to distinguish from an LTE base station (eNB). Further, hereinafter, the NR technology maybe applied to a base station, a donor base station and a relay node unless explicitly stated otherwise.

A gNB central unit (gNB-CU) means a logical node hosting RRC, SDAP and PDCP protocols and controls the operation of one or more gNB-DUs. Alternatively, the gNB-CU means a logical node hosting the RRC and a higher layer L2 protocol (PDCP). The CU controls the operation of one or more DUs. The CU terminates F1 interface connected with the DU. The gNB-CU also terminates F1 interface connected with the gNB-DU.

The DU is a logical node hosting RLC, MAC and PHY layers. The operation of the DU is partly controlled by the CU. One DU supports one or more cells. One cell is supported by only one DU. That is, the gNB-DU is a logical node hosting RLC, MAC and PHY layers, and its operation is partly controlled by gNB-CU. One gNB-DU supports one or multiple cells. One cell is supported by only one gNB-DU. The gNB-DU terminates F1 interface connected with the gNB-CU.

The NG-RAN includes a set of gNBs connected to the 5GC through the NG.

gNBs may be interconnected through the Xn interface. A gNB may include a gNB-CU and gNB-DUs. A gNB-CU and a gNB-DU is connected via F1 logical interface. One gNB-DU is connected to only one gNB-CU. For NG-RAN, the NG and Xn-C interfaces for a gNB consisting of a gNB-CU and gNB-DUs, terminate in the gNB-CU.

Thus, the F1 interface is an interface providing interconnection between the gNB-CU and the gNB-DU, and the F1 application protocol (F1AP) is used for providing a signaling procedure over the interface.

For EN-DC, the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

NR (New Radio)-Based Multi-Hop Relay

The 3GPP has been working on initial standardization for 5G wireless communication technology (NR) in order to satisfy various requirements according to technology development. In the NR in which high frequency bands are available, the relay technology may be increasingly utilized by the using of a wider bandwidth, a multi-beam system, and the like, comparing with the LTE. Through this, operators is able to more easily establish a dense network of self-backhauled NR cells. However, a millimeter wave band may have a drawback of experiencing severe short-term blocking. Further, a small coverage and a beam operation of the millimeter wave band may need to connect to a base station connected to a line or an optical fiber through a multi-hop relay. In this case, it is not possible to connect a UE to a base station connected to a line or an optical fiber using the relay technology based on the LTE technology. In particular, the multi-hop relay needs a multi-hop to process data, and it may be therefore difficult for the multi-hop relay to be used for delay-sensitive 5G service transmission. Further, to support low latency data transmission, QoS function, and the like, L2-based relay delivery is desirable rather than L3-based relay delivery as in the LTE.

To address such issues and support required functions, various relay structures may be considered.

FIGS. 8 to 13 are views illustrating various examples of L2-based relay structures according to embodiments of the present disclosure.

Figure 8:
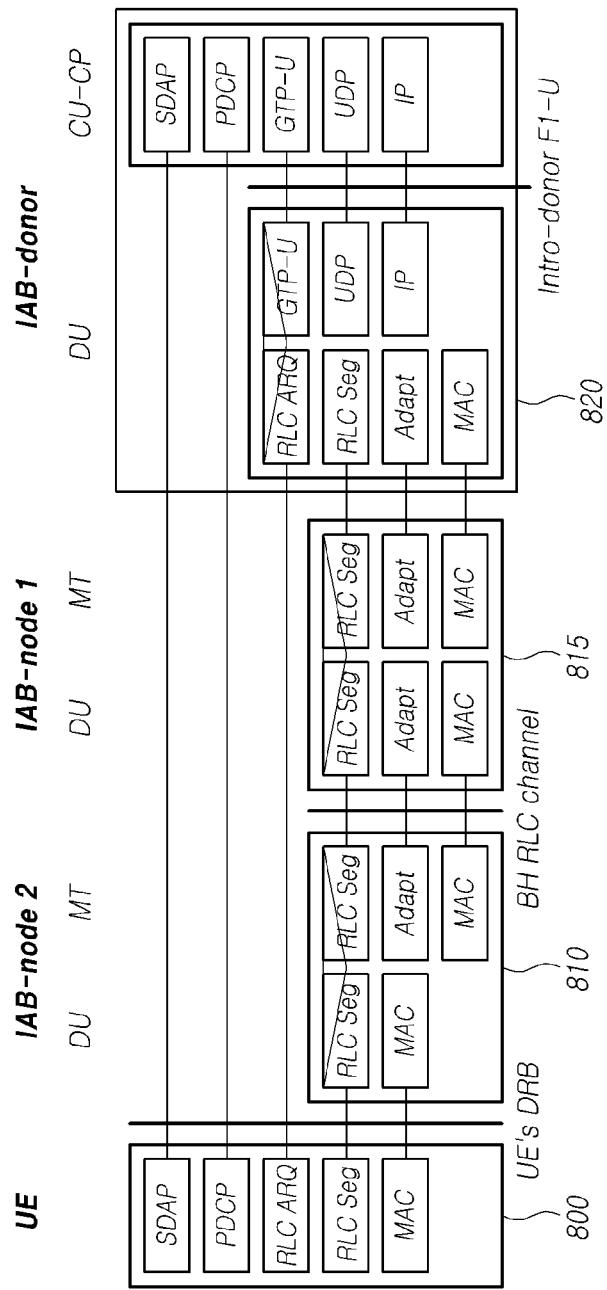
FIGS. 8 to 13 are views illustrating various examples of an L2-based relay structure according to embodiments of the present disclosure.

For example, referring to FIG. 8, a UE 800 may include separated RLC ARQ and RLC Seg functions. Further, IAB nodes 810 and 815 may include only the RLC Seg function, and the RLC ARQ function may be included in an IAB donor base station 820. Through this, the UE 800 and the IAB donor base station 820 may be able to secure data transmission and/or reception without being lost by performing an ARQ operation for data of an RLC entity. However, there is a problem that split RLC protocol entities are needed to be configured in the corresponding structure.

Figure 9:
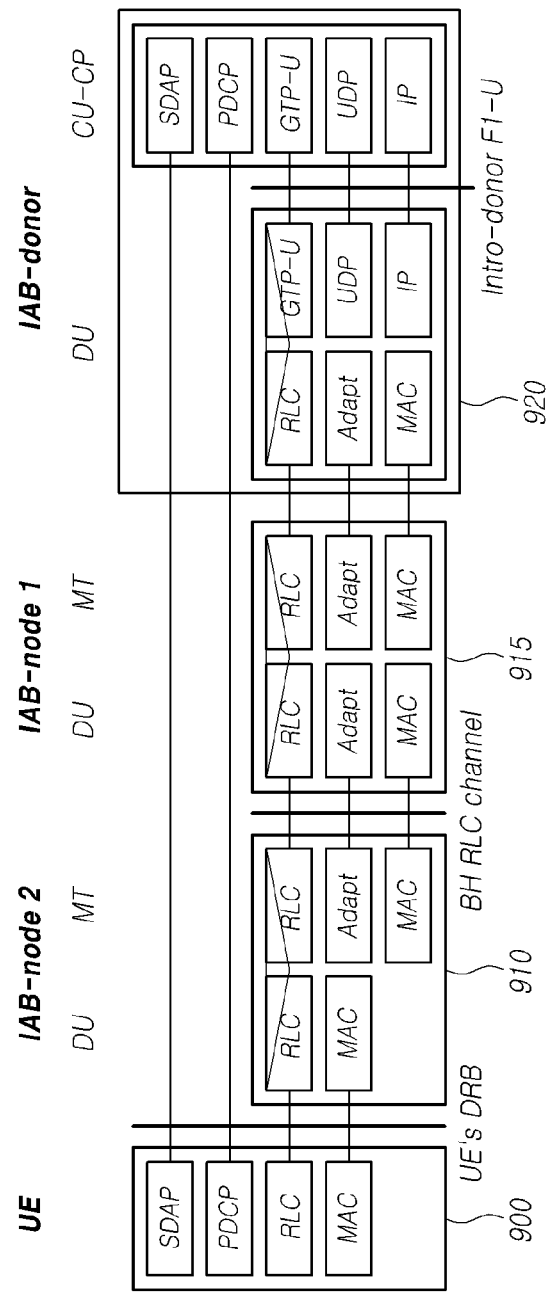

As another example, referring to FIG. 9, IAB nodes 910 and 915 can deliver data based on AM RLC. That is, when a UE 900 transmits data, in the IAB node 910, an RLC entity transmits successful reception for the corresponding data. When the RLC entity of the UE 900 receives the successful reception, the UE recognizes that the corresponding data has been successfully transmitted. Likewise, the IAB node 910 delivers the data to another IAB node 915. When the corresponding RLC entity receives information on the successful reception of the data, the IAB node 910 recognizes that the data has been successfully transmitted. The another IAB node 915 delivers the data to an IAB donor base station 920. When an associated RLC entity receives information on the successful reception of the data, the another IAB node 915 recognizes that the data has been successfully transmitted. The IAB donor base station 920 may be configured with split DU and CU and associated with an intra donor F1-U interface.

Figure 10:
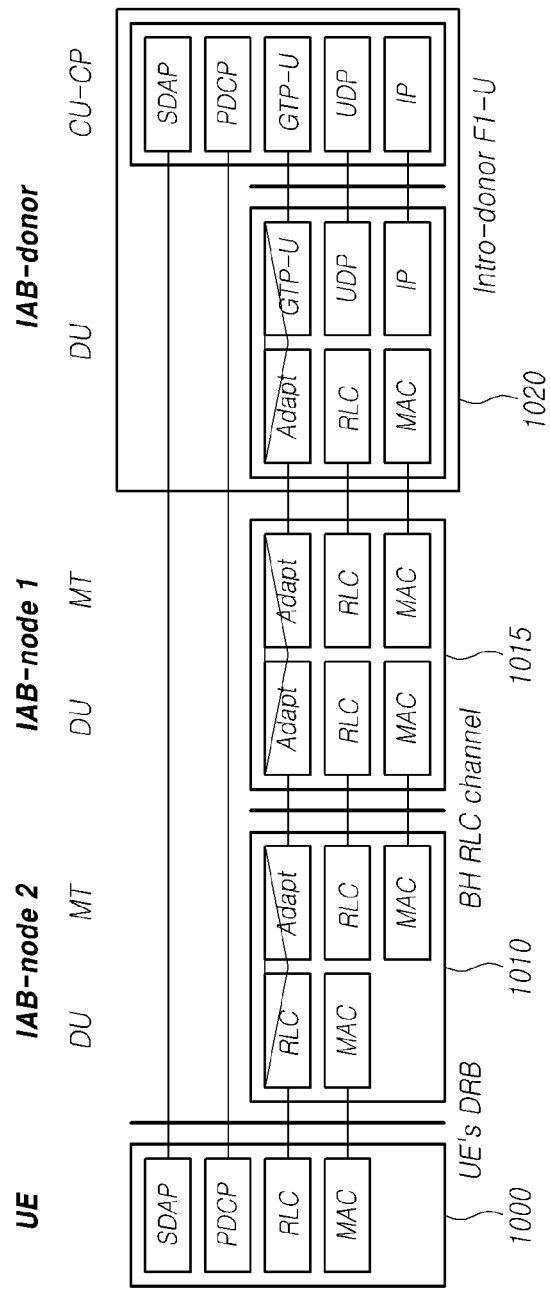

As another example, referring to FIG. 10, locations of Adapt entities and locations of RLC entities in the structure as shown in FIG. 9 may be changed to each other. That is, a UE 1000 in the structure of FIG. 10 is equal to that in the structure of FIG. 9. In IAB nodes 1010 and 1015, RLC layers may be configured under Adapt layers while data are delivered based on AM RLC.

Figure 11:
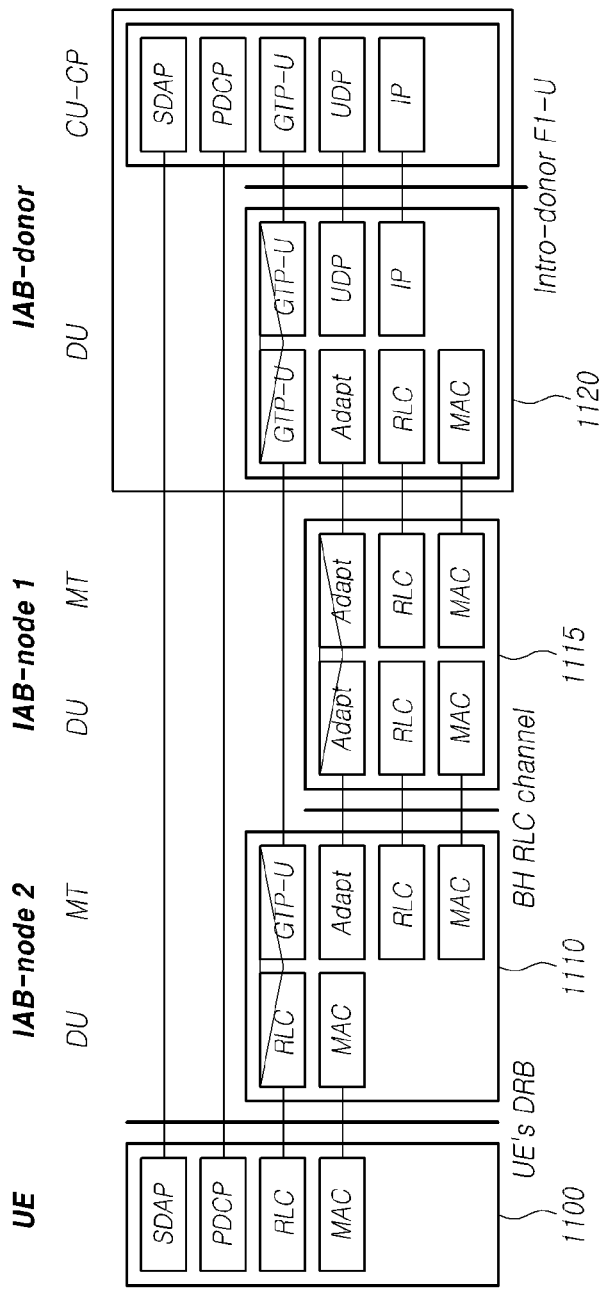

As another example, referring to FIG. 11, IAB nodes 1110 and 1115 may deliver data based on AM RLC. The IAB node 1110 is peered to a GTP-U entity of an IAB donor base station 1120 through its GTP-U entity. The IAB node 1110 delivers data to another IAB node 1115, and the anther IAB node 1115 delivers the data by being associated with the IAB-donor base station 1120.

Figure 12:
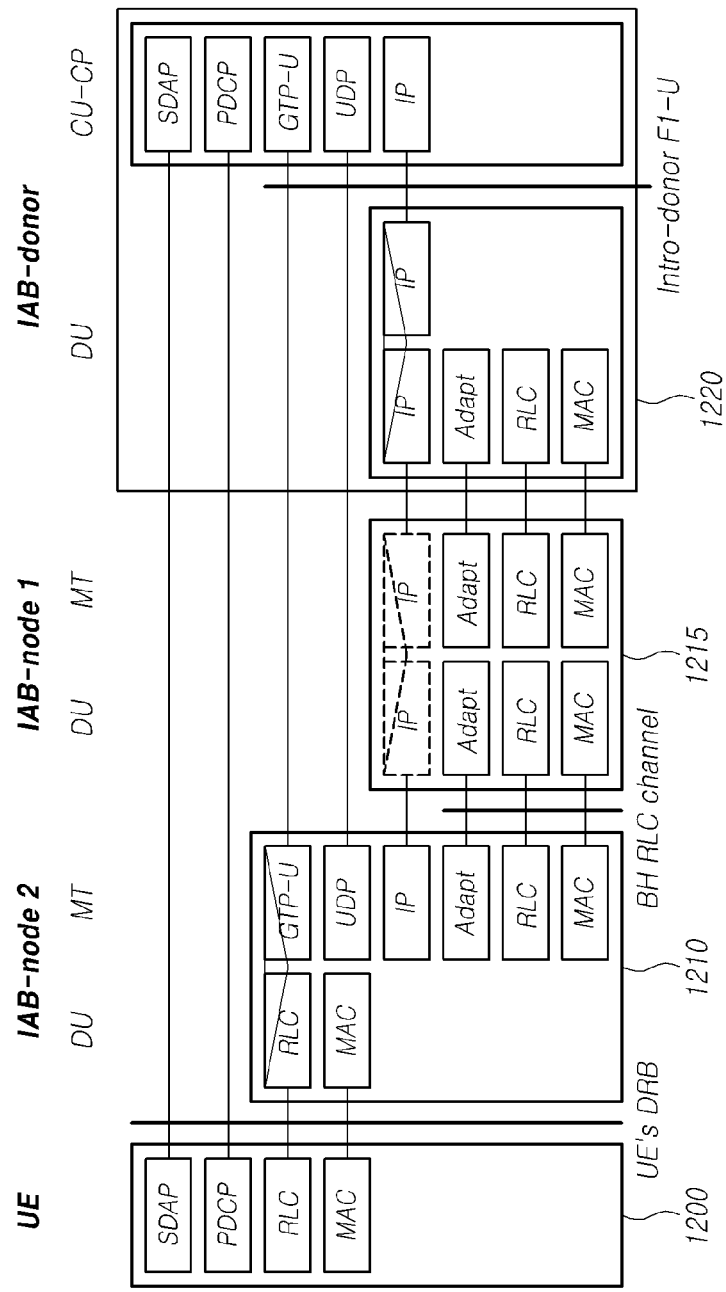

As another example, referring to FIG. 12, an IAB node 1210 receives user data from a UE 1200 through DRB. The IAB node 1210 induces a UE bearer identifier using logical channel identification information associated with an RLC PDU of the received uplink user data. Further, a relay node selects a backhaul RLC channel for transmitting the uplink user data based on at least one of the UE bearer identifier and donor base station address information.

The received uplink user data are delivered to another IAB node 1215 through the MT part. The IAB node 1210 selects the backhaul RLC channel to transmit the uplink user data to the another IAB node 1215. Further, the IAB node 1210 may additionally include, in the uplink user data to be transmitted to the another IAB node 1215, at least one of the UE bearer identifier, the address information of an IAB donor base station 1220, logical channel identification information, and mapping information between the logical channel identification information and the backhaul RLC channel.

The another IAB node 1215 delivers a message including the uplink user data received from the IAB node 1210 to the DU of the IAB donor base station 1220. The DU of the IAB donor base station 1220 delivers to the associated CU through an IP layer.

Figure 13:
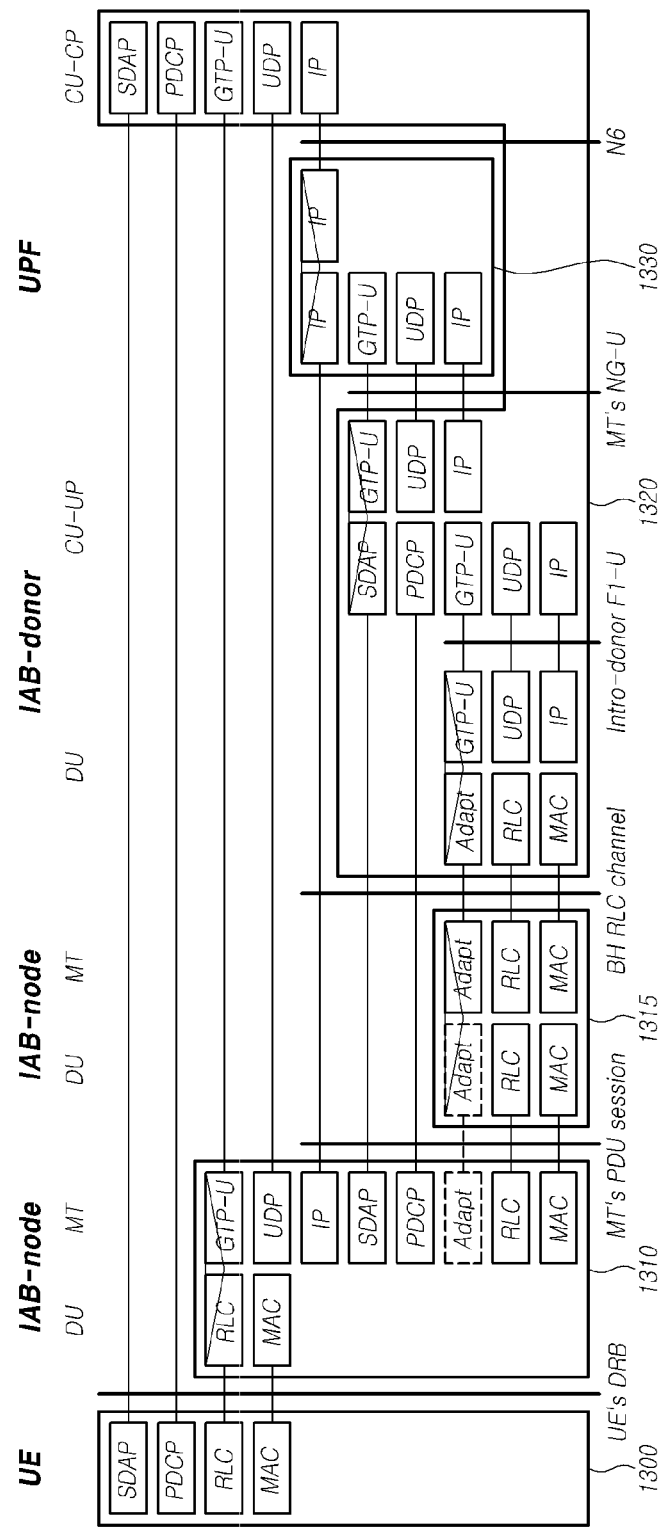

As another example, referring to FIG. 13, successful transmission of data may be recognized hop by hop based on AM RLC. In this case, an IAB node 1310 is associated with the CU of an IAB donor base station 1320 through SDAP layer, PDCP layer, UDP layer, GTP-U layer, and the like. Further, the CU of the IAB donor base station 1320 is associated with a UE 1300 through PDCP and SDAP layers. A UPF 1330 may be associated with the IAB node 1310 on an IP layer. It is possible to secure the reliability of transmitting data by hop-by-hop of such various structures through AM RLC-based structure.

When the layer 2-based relay structure is configured to transmit data based on the AM RLC as described above, the ARQ function may be configured hop by hop according to access and backhaul links.

However, in this case, a PDCP entity of a UE (or a donor base station) receives an indication for acknowledging successful transmission of a previous radio link. According to the received indication, the PDCP entity of the UE considers that a PDCP SDU is successfully transmitted.

When the ARQ function is configured hop by hop, if an RLC packet is lost in any successive radio link, the transmission of this packet cannot be guaranteed. For example, in the case of PDCP data recovery, PDCP reconfiguration, or the like, since a packet recognized as having been successfully transmitted is deleted, this packet cannot be retransmitted; therefore, may be lost.

To solve such problems, methods and apparatuses for data retransmission according to embodiments are provided below.

Data Retransmission Operations

A UE may perform a step of transmitting, by a packet data convergence protocol (PDCP) entity, PDCP data for acknowledged mode data radio bearer (AM DRB) to a donor base station through one or more relay nodes.

For example, the UE can transmit uplink data to the donor base station through a relay node. That is, the PDCP layer delivers a PDCP PDU or SDU to an associated RLC entity, and then, the UE transmits the uplink data to the relay node associated with the UE. The uplink data (ex, PDCP data) are data for the AM DRB. Thus, an ARQ operation for transmission acknowledgment should be performed. For example, the PDCP entity of the UE can perform uplink data transmission by delivering PDCP data for the AM DRB to an AM RLC entity.

In this case, the UE may be able to receive acknowledgment response as to whether the data has been successfully transmitted from a relay node (e.g., the DU of the relay node) that has transmitted the uplink data according to the ARQ operation of the AM RLC entity. If the acknowledgment response for the successful transmission is not received, or a response indicating transmission failure is received, the UE performs a retransmission operation for the corresponding packet. The retransmission operation may be performed by the AM RLC entity.

However, as described above, although a relay node directly connected with the UE through Uu interface has successfully received data of the UE, the relay node may not be associated with a next relay node, or the data may not be successfully delivered up to a donor base station. There is no way the UE can recognize such situations; thus, the retransmission operation cannot be performed as well. For example, an AM RLC entity performs an acknowledgment response for successful transmission for a specific packet, and the PDCP entity flushes the packet. Alternatively, the packet is discarded as a PDCP discard timer expires. Accordingly, the packet is lost even when it is not successfully delivered to the donor base station.

To solve this problems, in accordance with embodiments of the present disclosure, a UE may receive retransmission indication information as follows.

A UE may perform a step of receiving retransmission indication information indicating PDCP data retransmission from a donor base station.

For example, the retransmission indication information may be included in a PDCP status report. Alternatively, the PDCP status report message itself may perform a function as the retransmission indication information. The transmission of the PDCP status report may be triggered a specific trigger event. Alternatively, unlike to a typical trigger condition, the transmission of the PDCP status report may be periodically triggered. That is, the PDCP status report may be periodically transmitted even when a trigger event, such as PDCP data recovery or PDCP reconfiguration, does not occur. The PDCP status report message may be transmitted by being triggered by a PDCP entity.

As another example, the retransmission indication information may be included in a radio resource control (RRC) message. For example, the transmission of the RRC message including the retransmission indication information may be triggered by a trigger cause distinguished from a PDCP data recovery cause and a PDCP reconfiguration cause. As another example, the RRC message may indicate retransmission by including information element distinguished from a PDCP data recovery cause and a PDCP reconfiguration cause. As another example, the RRC message may be configured to be periodically transmitted.

As described above, the transmission of the retransmission indication information may be triggered by various causes. For example, the transmission of the retransmission indication information may be periodically triggered. As another example, the transmission of the retransmission indication information may be triggered when a donor base station detects a backhaul link failure for one or more relay nodes. As another example, the transmission of the retransmission indication information may be triggered according to a data transmission path change event occurrence.

For a backhaul link between relay nodes or between a relay node and a donor base station, when a backhaul link failure is detected, the relay node can deliver backhaul link failure detection information to another relay node associated with the relay node. As another example, when a backhaul link failure is detected, the relay node can deliver backhaul link failure detection information to the donor base station.

Thereafter, the UE may perform a step of retransmitting, by the PDCP entity, a PDCP data protocol data unit (PDU) or service data unit (SDU) based on the retransmission indication information.

When the retransmission indication information is received, the UE selects and retransmits a PDCP data PDU or SDU needed to be retransmitted using the retransmission indication information.

For example, a PDCP data PDU or SDU to be retransmitted may include a PDCP data PDU or SDU of which delivery has been acknowledged by the radio link control (RLC) entity of the UE. That is, even though successful transmission has been acknowledged according to an ARQ operation of the RLC entity, retransmission for a PDCP data PDU or SDU instructed to be retransmitted may be performed. For example, all PDCP data PDUs or SDUs previously transmitted may be retransmitted to the corresponding AM RLC entity (in which a discard timer has not expired). As another example, all PDCP data PDUs or SDUs stored in a transmission PDCP entity may be retransmitted.

As another example, a PDCP data PDU or SDU to be retransmitted may include only a PDCP data PDU or SDU of which delivery has not been acknowledged by a PDCP status report message. In this case, retransmission indication information is indicated by the PDCP status report message. When the PDCP status report message is received, the UE can identify data that have not been delivered normally to a donor base station by the PDCP status report information, and then, retransmit only a PDCP data PDU or SDU of the corresponding data.

As another example, a PDCP data PDU or SDU to be retransmitted may entire PDCP data PDUs or SDUs indicated by a PDCP status report message or an RRC message.

Through these operations, the UE is able to perform data transmission operations with high reliability to a donor base station through a plurality of multi-hip relay nodes without packet loss. Further, it is possible to prevent a packet from being lost when performing ARQ operations hop by hop.

Hereinbefore, the embodiments are described by focusing on a situation where the UE transmits uplink data. However, the embodiments of the present disclosure may be also applicable to downlink data. Further, the donor base station can perform an operation paired with the UE operation described above.

Data Congestion Control Operations

Meanwhile, as described above, in downlink transmission, a relay node (IAB node) provides a functionality of receiving data from a node at a higher level in topology (a donor base station or a relay node at a higher level) and delivering the data to a node at a lower level (a lower relay node receiving data from a higher node or a UE). Hereinafter, for convenience of the description, a lower relay node receiving data from a higher node is referred to as a child IAB node or an IAB node. Further, a node at a higher level in a direction of a donor base station from the child IAB node is referred to as a parent IAB node. Accordingly, the child IAB node and the parent IAB node are relative definitions; according to a scope of description and a functional focus, the parent IAB node may become the child IAB node, and the child IAB node may become the parent IAB node.

When receiving data from a network node at a higher level, a parent IAB node delivers the data to a child IAB node. If data congestion occurs in the child IAB node, when the child IAB node receives the data from the parent IAB node, there may occur a situation where the child IAB node cannot process the received data. For example, due to a buffer overflow of the child IAB node, the child IAB node cannot receive downlink data, or received downlink data may be discarded. The overflow in the IAB node may occur when downlink data cannot be transmitted and are continually accumulated in a buffer due to sudden degradation of quality of a radio link.

Accordingly, a technology of data control process is needed for stable operations in various structures for transmitting data by connecting a L2-based 5G wireless relay with a multi-hop as described above. In particular, it is necessary to provide a processing operation for a data processing disablement situation that may occur while a parent IAB node receives data from a network node at a higher level and delivers the received data to a child IAB node. Further, it is necessary to provide an operation for identifying an amount of expected transmission data of a child IAB node.

Hereinafter, in a layer 2-based multi-hop relay structure, methods and apparatuses according to embodiments are provided for effectively processing a problem that may cause a congestion occurrence over a relay node and using a radio resource seamlessly.

Hereinafter, the methods and apparatus according to embodiments will be described by focusing on a situation that relays NR access for an NR UE to an NR base station (a donor base station) through an NR-based wireless self-backhauling. However, the embodiments are not limited thereto. It should be noted that this is just an example for the purpose of description; each embodiment described below may be also applicable to a situation that relays LTE access for an LTE UE to an LTE base station (a donor base station) through NR-based wireless self-backhauling. Further, embodiments of the present disclosure maybe applicable to a situation that relays NR technology based access (of an IAB node) to an LTE base station (or a donor base station) providing EN-DC through NR backhaul.

A donor base station herein means a wireless network node (or a base station, a gNB, or a part of the gNB) terminating an interface (NG interface, e.g., N2 interface, N3 interface) for a core network. The donor base station may be physically connected to a core network or another base station through a line or an optical fiber. Further, the donor base station can establish backhaul with another NR node, such as a base station, a CU, a DU, a core network node (AMF, UPF etc.), or the like, using NR radio technology. Like the NR base station, the donor base station may be made up of one CU and one or more DUs. The donor base station may be replaced with various terms, such as an IAB-DN, a DgNB, a DN, or the like.

Meanwhile, an integrated access and backhaul (IAB) node means a node supporting access and wireless self-backhauling for a UE using NR radio technology. The IAB node may establish backhaul to other NR nodes (parent nodes (IAB-node-MT's next hop neighbour node) and child nodes (IAB-node-DU's next hop neighbour node) using the NR radio technology. Further, the IAB node cannot be physically connected to another NR node through a line or an optical fiber. The IAB node may be replaced with various terms, such as a relay node, an NR-RN, an NR relay, an integrated node, or the like. Hereinafter, embodiments will be described using the relay node or the IAB node.

Further, a Un interface represents an interface between IAB nodes and an interface between an IAB node and a donor base station. The Un interface may be replaced with various terms, such as an IAB backhaul interface, a U-IAB interface, a Ui interface, an NR Uu interface, a F1 interface, or the like.

Each IAB node includes one DU and one mobile-termination (MT). The IAB node is connected to a higher-level IAB node or a donor base station through the MT. The IAB node establishes an RLC channel to a lower-level IAB node or a UE through the DU. That is, the IAB node is configured by including DU and MT functions. Here, the DU function is a function to serve as a function of a base station from a lower level perspective, and the MT function is a function to serve as a function of a UE from a higher level perspective.

Meanwhile, communication quality degradation according to data congestion may occur in all situations including uplink data transmission and downlink data transmission. As described above, congestion herein may mean a situation where data exceed a limit capacity for processing data in an IAB node or a situation where data exceed a set critical capacity. That is, the congestion state means not only a situation where data that cannot be delivered are present due to a capacity limit in an actual IAB node, but a situation where data exceed a critical value to such an extent that a risk can be recognized.

In the case of uplink transmission, when a child IAB node receives data from a UE or an IAB at a lower layer, the child IAB node delivers the data to a parent IAB node. At this time, data congestion may occur in the parent IAB node. For example, in transmitting uplink data by a parent IAB node (or the MT of the parent IAB node) to another parent IAB node in an upstream location in topology or a donor base station, as the parent IAB node cannot timely transmit the uplink data due to the degradation of quality of a radio link, the uplink data may be accumulated in an RLC buffer and/or an adaptation layer buffer above a predetermined level. At this time, there may occur a situation where data that have received from a child IAB node cannot be delivered or can be discarded. In this case, the parent IAB node may enable the uplink data not to be discarded by reducing or limiting uplink scheduling grants to the child IAB node. However, the parent IAB node can check only an uplink buffer status of a child IAB node, or a UE, which is directly connected with the parent IAB node. Accordingly, it is not easy for the parent IAB node to check a situation where uplink data of a lower IAB node which are relayed through the child IAB node directly connected with the parent IAB node are increased, and thereby, it may be difficult to transmit the data seamlessly.

On the other hand, in the case of downlink transmission, when receiving data from a network node at a higher level, a parent IAB node delivers the data to a child IAB node. At this time, data congestion may occur in the child IAB node. For example, the child IAB node (or the DU of the child IAB node) transmits the downlink data to a lower child IAB node in a downstream location in topology or a UE. In this case, as the child IAB node cannot timely transmit the downlink data due to the degradation of quality of a radio link, the downlink data may be accumulated in an RLC buffer and/or an adaptation layer buffer above a predetermined level. At this time, the data from the parent IAB node cannot be received, or while delivering the data received by the MT of the child IAB node to the DU of the child IAB node, the corresponding data may be discarded.

Like this, if the downlink data are lost at the IAB node, it may be difficult to transmit wireless data without loss for a radio bearer operating in an RLC AM mode.

For example, even when a parent IAB node (the DU of the parent IAB node) transmits downlink data to a child IAB node (the MT of the child IAB node), and the child IAB node (the MT of the child IAB node) successfully receives the data, the downlink data received by the MT of the child IAB node may be lost due to an overflow in a buffer in the DU of the child IAB node. At this time, if the RLC ARQ operates hop by hop as shown in FIG. 9 to FIG. 13. the parent IAB node (the UD of the parent IAB node) considers that the transmitted downlink data have been successfully received by the child IAB node (the MT of the child IAB node). Alternatively, the parent IAB node (the DU of the parent IAB node) may receive an acknowledge (ACK) message from the child IAB node in response to the successful reception of the transmitted downlink data. Accordingly, even which the transmitted data have been lost in the child IAB node, the parent IAB node (the DU of the parent IAB node) does not perform retransmission for the lost downlink data. In the end, since a TCP layer is required to retransmit the lost downlink data, overall transmission performance may be lowered. The data described above may be a typical RLC SDU.

Although discussions have been conducted on downlink data processing for convenience of the description, this situation may also occur in uplink data processing. Further, although discussions have been conducted on RLC data transmission for convenience of the description, the data described above may be user plane data, such as an adaptation SDU, an adaptation PDU, an RLC PDU, a PDCP PDU, or the like.

Hereinafter, operations of an IAB node and a donor base station for solving the problems described above will be described with reference to accompanying drawings.

Figure 14:
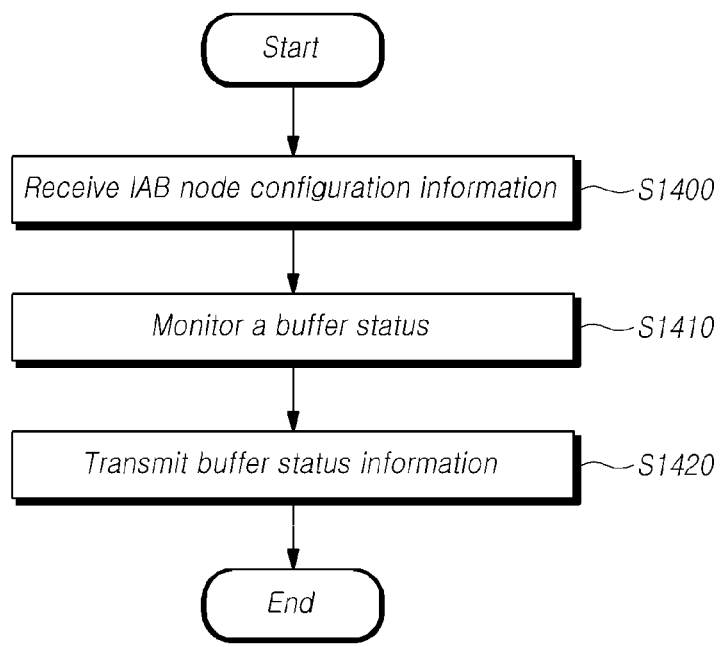
FIG. 14 is a flow diagram illustrating operations of an IAB node according to embodiments of the present disclosure.

FIG. 14 is a flow diagram illustrating operations of an IAB node according to embodiments of the present disclosure.

Referring to FIG. 14, an integrated access and backhaul (IAB) node performs a step of receiving IAB node configuration information including information for configuring a mobile-termination (MT) function and a distribute unit (DU) function of the IAB node from a donor base station, at step S1400. As described above, the IAB node may be a child IAB node, or a parent IAB node.

The IAB node establishes DU and MT functions (configurations) in the IAB node. To do this, the IAB node may receive the IAB node configuration information from the donor base station. The IAB node configuration information may include parameter information used to configure the associated DU and MT. Further, the IAB node configuration information may include parent IAB node information or donor base station information associated with the IAB node. As another example, the IAB node configuration information may include at least one of trigger condition information for triggering the transmission of downlink buffer status information or uplink buffer status information, information for indicating a trigger, and signaling information used to transmit buffer status information. For example, the trigger condition information may include buffer threshold value information or associated timer information for transmitting a buffer status report.

By establishing the DU and MT functions after receiving the IAB node configuration information and, the IAB node causes the IAB node to be established in a relay node.

The IAB node performs a step of monitoring an uplink buffer status or a downlink buffer status in the IAB node, at step S1410. The IAB node monitors an uplink data or downlink data processing status.

For example, the IAB node monitors a status of a downlink buffer while processing downlink data. That is, the IAB node monitors whether data buffered in the downlink buffer exceed a threshold value set for buffer status information transmission, whether the data buffered in the downlink buffer satisfy a trigger condition for the buffer status information transmission, or the like. As another example, the IAB node may monitor whether downlink data are lost while the data are delivered from the MT to the DU of the IAB node. Here, the buffer that the IAB node monitors may be one of a downlink buffer configured in the MT and a downlink buffer configured in the DU.

As another example, the IAB node monitors a status of an uplink buffer while processing uplink data. That is, the IAB node monitors whether data buffered in the uplink buffer exceed a threshold value set for buffer status information transmission, whether the data buffered in the uplink buffer satisfy a trigger condition for the buffer status information transmission, or the like. As another example, the IAB node may monitor whether uplink data are lost while the data are delivered from the DU to the MT of the IAB node. Here, the buffer that the IAB node monitors may be one of an uplink buffer configured at the MT and an uplink buffer configured at the DU.

The IAB node may configure respective buffers in the MT and the DU for each of uplink and downlink. As another example, the IAB node may configure a single buffer by integrating buffers in the MT and the DU. When the IAB node configures a single buffer, the IAB node is able to monitor only the corresponding buffer. Unlike this, when the IAB node configures respective buffers in the MT and the DU, the IAB node monitors the respective buffers. Data loss in the IAB node means that the data are discarded while the data are delivered from the DU to MT or from the MT to the DU, or lost due to a buffer overflow, The IAB node performs a step of transmitting downlink buffer status information or uplink buffer status information to the donor base station or an associated parent IAB node based on a result of the monitoring for the uplink buffer status or the downlink buffer status, at step S1420. For example, when the result of the monitoring for the buffer status satisfies a buffer status information transmission trigger condition, the IAB node transmits buffer status information.

For example, when downlink data are lost in the IAB node, the IAB node may transmit downlink buffer status information to the donor base station or the associated parent IAB node. The IAB node may transmit the downlink buffer status information to the associated parent IAB node by including the downlink buffer status information in a MAC control element (MAC CE) or a backhaul adaptation protocol (BAP) control PDU. As another example, the IAB node may transmit the downlink buffer status information to the donor base station by including the downlink buffer status information in a F1 user plane protocol header or a F1AP message. That is, the IAB node delivers the downlink buffer status information to an entity in a higher level using a different message depending on an entity receiving the downlink buffer status information.

As another example, when uplink data are lost in an IAB node, the IAB node may transmit uplink buffer status information to an associated parent IAB node. For example, the IAB node may transmit the uplink buffer status information to an associated parent IAB node by including the uplink buffer status information in a MAC control element (MAC CE) or a backhaul adaptation protocol (BAP) control PDU. As another example, the IAB node may transmit the uplink buffer status information to a donor base station by including the uplink buffer status information in a F1 user plane protocol header or a F1AP message. That is, the IAB node delivers the uplink buffer status information to an entity in a higher level using a different message depending on an entity receiving the uplink buffer status information. As another example, the IAB node may deliver the uplink buffer status information to a child IAB node configured in a lower level. In this case, the uplink buffer status information may be included in a MAC control element (MAC CE) or a backhaul adaptation protocol (BAP) control PDU.

Meanwhile, the uplink buffer status information or downlink buffer status information may include at least one of buffer size information, IAB node identifier information, backhaul RLC channel identifier information, UE bearer identifier information and logical channel group identifier information.

For example, the buffer size information may be made up of information obtained by adding buffer size information configured in the mobile-termination (MT) and buffer size information configured in the distribution unit (DU). As another example, the buffer size information may distinguishably include buffer size information configured in the mobile-termination (MT) and buffer size information configured in the distribution unit (DU). That is, the buffer size information configured in the mobile-termination (MT) and the buffer size information configured in the distribution unit (DU) are distinguished from each other, and then included in the buffer size information. That is, the buffer size information may include buffer size information configured in the MT and/or buffer size information configured in the DU by distinguishing whether the buffer size information is the buffer size information configured in the MT or the buffer size information configured in the DU, or may include entire buffer size information only. As another example, the buffer size information may include only buffer size information on any one of the MT and the DU.

As another example, the buffer size information may include size information on an uplink data buffer and/or a downlink data buffer by distinguishing whether the buffer size information is size information on the uplink data buffer or the downlink data buffer. As another example, buffer size information included in uplink buffer status information may include only information on an uplink buffer, and buffer size information included in downlink buffer status information may include only information on a downlink buffer.

In addition, the IAB node identifier may mean information for identifying an IAB node generating buffer status information. The backhaul RLC channel identifier information may mean information for identifying a backhaul RLC channel associated with a corresponding IAB node. The UE bearer identifier information may mean information for identifying a bearer of a UE associated with an IAB node, and the logical channel group identifier may mean information for identifying a logical channel group of a UE associated with the IAB node.

Through these operations, the parent IAB node or the donor base station may recognize information on a buffer status of an IAB node at a lower level. Accordingly, when transmitting downlink data, it is possible to check the presence or absence of data loss, or a possibility of data loss in an IAB node. In the case of uplink data, it is possible to check a possibility of data loss according to loss in an IAB node. If an IAB node transmits buffer status information to an entity at a lower level, an IAB node at a lower level or a UE can recognize the presence or absence of uplink data loss or a possibility of loss.

Accordingly, it is possible to prevent data loss from occurring in a specific IAB node in an IAB network made up of multiple hops. Further, the IAB network may newly establish a data transmission path using the buffer status information. That is, in order to cure a congestion status of an IAB node in which data congestion has occurred, a donor base station or a parent IAB node may configure a data transmission path established in the IAB node to bypass another IAB node.

Figure 15:
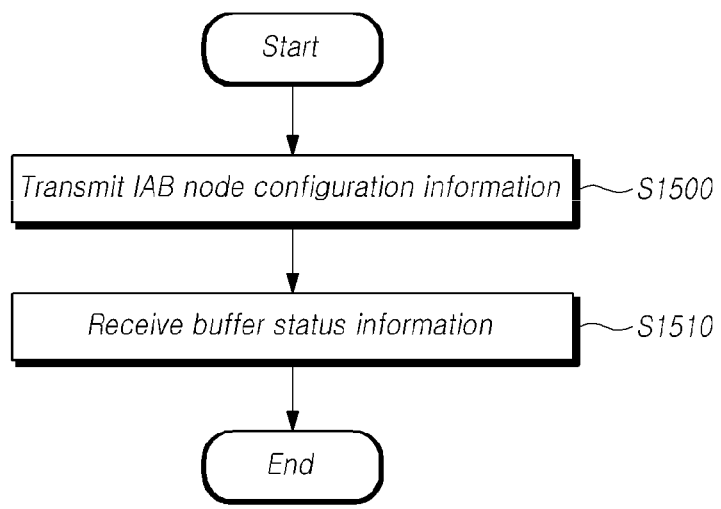
FIG. 15 is a flow diagram illustrating operations of a donor base station according to embodiments of the present disclosure.

FIG. 15 is a flow diagram illustrating operations of a donor base station according to embodiments of the present disclosure.

Referring to FIG. 15, a donor base station performs a step of transmitting, to an integrated access and backhaul (IAB) node, IAB node configuration information including information for configuring a mobile-termination (MT) function and a distribute unit (DU) function of the IAB node, at step S1500.

The donor base station is able to establish an IAB network and establish IAB nodes in the IAB network. To do this, the donor base station may transmit the IAB node configuration information for configuring the DU and the MT of the IAB node to the IAB node.

For example, the IAB node configuration information may include parameter information used to configure the associated DU and MT. Further, the IAB node configuration information may include parent IAB node information or donor base station information associated with the IAB node. As another example, the IAB node configuration information may include at least one of trigger condition information for triggering the transmission of downlink buffer status information or uplink buffer status information, information for indicating a trigger, and signaling information used to transmit buffer status information. For example, the trigger condition information may include buffer threshold value information or associated timer information for transmitting a buffer status report.

The IAB node may determine whether to trigger the transmission of the buffer status information through operations related to FIG. 14 described above.

When the buffer status information transmission is triggered in the IAB node, the donor base station performs a step of receiving an F1 user plane protocol header or an F1AP message including downlink buffer status information of the IAB node, at step S1510.

For example, the downlink buffer status information may include at least one of buffer size information, IAB node identifier information, backhaul RLC channel identifier information, UE bearer identifier information and logical channel group identifier information.

For example, the buffer size information may be made up of information obtained by adding buffer size information configured in the mobile-termination (MT) and buffer size information configured in the distribution unit (DU) of the corresponding IAB node. As another example, the buffer size information may distinguishably include buffer size information configured in the mobile-termination (MT) of the IAB node and buffer size information configured in the distribution unit (DU) of the IAB node. That is, the buffer size information configured in the mobile-termination (MT) and the buffer size information configured in the distribution unit (DU) are distinguished from each other, and then included in the buffer size information. That is, the buffer size information may include buffer size information configured in the MT and/or buffer size information configured in the DU by distinguishing whether the buffer size information is the buffer size information configured in the MT or the buffer size information configured in the DU, or may include entire buffer size information only. As another example, the buffer size information may include only buffer size information on any one of the MT and the DU.

As another example, the buffer size information may include size information on an uplink data buffer and/or a downlink data buffer by distinguishing whether the buffer size information is size information on the uplink data buffer or the downlink data buffer. As another example, buffer size information included in uplink buffer status information may include only information on an uplink buffer, and buffer size information included in downlink buffer status information may include only information on a downlink buffer.

In addition, the IAB node identifier that may be included in the buffer status information may mean information for identifying an IAB node generating the buffer status information. The backhaul RLC channel identifier information may mean information for identifying a backhaul RLC channel associated with a corresponding IAB node. The UE bearer identifier information may mean information for identifying a bearer of a UE associated with an IAB node, and the logical channel group identifier may mean information for identifying a logical channel group of a UE associated with the IAB node.

In addition, when the buffer status information transmission is triggered in the IAB node, the donor base station may receive an F1 user plane protocol header or an F1AP message including uplink buffer status information of the IAB node.

Through these operations, the donor base station can recognize information on a buffer status of the IAB node. Accordingly, when transmitting downlink data, it is possible to check the presence or absence of data loss, or a possibility of data loss in an IAB node. In the case of uplink data, it is possible to check a possibility of data loss according to loss in an IAB node.

Hereinafter, respective steps, operations, messages, information for operations of the UE and the base station according to the embodiments will be described in detail.

Each detailed embodiment below may be performed by a UE and a base station, independently or in a combination with one or more of other detailed embodiments.

Embodiments of Triggering Status Reporting

An AM RLC entity transmits a status PDU to a peer AM RLC entity in order to provide positive and/or negative acknowledgments of RLC SDUs. In the NR technology, status reporting is triggered in two cases. In one case, the status reporting is triggered when polled by a peer AM RLC entity. In the other case, the status reporting is triggered when a reception failure of one AMD PDU is detected.

The status reporting may be the buffer status information transmission described above.

In a first embodiment, the status reporting may be triggered when an AM RLC entity detects a success or failure of relay delivery for data. The relay delivery means a series of operations for transmitting downlink or uplink data to a device or an entity at a lower level or a higher level through delivering between the MT and the DU of an IAB node.

In the typical NR technology, status reporting is constructed according to whether a receiving AM RLC entity receives the corresponding data. In accordance with embodiments of the present disclosure, in order for status reporting to be triggered when a receiving AM RLC entity detects a success or failure of relay delivery, following considerations can be provided when constructing the status reporting as other examples for solving the problems described above.

When constructing a STATUS PDU, the AM RLC entity shall:
- for the RLC SDUs with SN such that RX_Next<=SN<RX_Highest_Status that has not been completely received yet, or has not been completely acknowledged for relay delivery in next backhaul link yet, in increasing SN order of RLC SDUs and increasing byte segment order within RLC SDUs, starting with SN=RX_Next up to the point where the resulting STATUS PDU still fits to the total size of RLC PDU(s) indicated by lower layer:
- for an RLC SDU for which no byte segments have been received yet, or for an RLC SDU for which no byte segments have been delivered yet,
- include in the STATUS PDU a NACK_SN which is set to the SN of the RLC SDU.
- for a continuous sequence of byte segments of a partly received RLC SDU that have not been received yet, or for a continuous sequence of byte segments of a partly received RLC SDU that have not been delivered yet:
- include in the STATUS PDU a set of NACK_SN, SOstart and SOend.
- for a continuous sequence of RLC SDUs that have not been received yet, or for a continuous sequence of RLC SDUs that have not been received yet:
- include in the STATUS PDU a set of NACK_SN and NACK range;
- include in the STATUS PDU, if required, a pair of SOstart and SOend.
- set the ACK_SN to the SN of the next not received RLC SDU which is not indicated as missing in the resulting STATUS PDU.

In a second embodiment, when failing in a relay delivery, status reporting may be triggered so that an RLC control PDU can be transmitted. The RLC control PDU may be configured to have a PDU type value distinguished from RLC STATUS PDU.

For example, the RLC control PDU may include a format identical to the RLC STATUS PDU or one or more fields identical to a field included in the RLC STATUS PDU. As another example, the RLC control PDU may have a different format from the RLC STATUS PDU. For example, in an IAB node, in order for an AM RLC entity of its MT received downlink data to deliver the downlink data in a downstream direction, the AM RLC entity may deliver the downlink data to an associated AM RLC entity of its DU (or any L2 entity of the DU or a buffer of the corresponding entity). In this case, a unit of being delivered may be configured only on an RLC SDU basis and may not be configured on an RLC segment basis. Accordingly, the RLC control PDU may be made up of ACK_SN* of an RLC SDU for which relay delivery has successfully performed, NACK_SN* of an RLC SDU for which relay delivery has failed, an extension field for indicating whether the NACK_SN* follows, a D/C distinguishing field, a Control PDU type (CPT) field. Here, the ACK_SN* represents the SN of a next unreceived RLC SDU, following a last RLC SDU not reported as being lost in the RLC control PDU (in the relay delivery). The NACK_SN* represents the SN of an RLC SDU lost by the failure of relay delivery in a reception side of an RLC entity.

Like this, status reporting may be triggered variously.

Meanwhile, when status reporting is received, corresponding lost data can be retransmitted. In this case, it is necessary to distinguish between loss over radio link and loss in an IAB node. Accordingly, various embodiments for transmission may be applicable as described below.

When receiving a negative acknowledgment for a relay delivery failure that has received by a peer AM RLC entity, a transmission side of an AM RLC entity can consider retransmitting a corresponding RLC SDU for which the negative acknowledgment has received.

For example, when the RLC SDU is considered to be retransmitted, if the RLC SDU is firstly considered to be retransmitted, the transmission side of the AM RLC entity sets a retransmission count associated with the corresponding RLC SDU as 0. Otherwise, the transmission side of the AM RLC entity increases the retransmission count. If the retransmission count is equal to a maximum retransmission threshold value, the transmission side of the AM RLC entity indicates reaching the maximum retransmission to a higher layer.

As another example, a relay delivery may fail due to a problem in a corresponding child IAB node. When data is lost in an IAB node, retransmission maybe performed without the application of the maximum retransmission threshold value and the retransmission count. This is because when the retransmission count reaches the maximum retransmission threshold value (the retransmission count is equal to the maximum retransmission threshold value), this is required to be indicated to a higher layer, and the higher layer is required to declare a radio link failure; however, this is not a failure over the radio link.

As another example, retransmission maybe performed without increasing a retransmission count in retransmission due to a relay delivery failure.

As another example, using a parameter different from a typical retransmission count in retransmission due to a relay delivery failure, retransmission maybe performed by increasing the parameter. When the parameter reaches a maximum retransmission threshold value, this is needed to be indicated to a higher layer, but the higher layer may cause a reconfiguration procedure due to a radio link failure not to be triggered.

As another example, retransmission maybe performed without increasing a retransmission count (remaining as is) in retransmission due to a relay delivery failure. That is, retransmission maybe performed by increasing a retransmission count only in the case of a radio link transmission failure rather than a relay delivery failure.

As another example, when a relay delivery fails, this is caused by a corresponding child IAB node downstream transmission (delivery in the node) problem, and thus, not a transmission problem occurring over a radio link between a parent IAB node and the child IAB node. This may occur in the child IAB node according to a failure/outage, or the like of a radio link with a lower child IAB node in downstream transmission or a UE, if retransmission is performed in this situation, there is a possibility that downlink data to be retransmitted may be lost again due to a relay delivery failure. Accordingly, in the case of retransmission due to a relay delivery failure, a parent IAB node may cause a retransmission, or a transmission in a corresponding RLC channel or a corresponding radio bearer, to be restricted. For example, by transmitting buffer status information described above, a status related to a correspondence loss can be delivered to the parent IAB node.

More specifically, a child IAB node may deliver information (e.g., buffer status information) for instructing downlink transmission (or retransmission) due to a relay delivery failure to be restricted to a parent IAB node through the RLC STATUS PDU or the RLC Control PDU described above. If the indicated information is a timer, when the timer expires, the parent IAB node may resume downlink transmission or retransmission. If the indicated information is for instructing downlink transmission or retransmission for a corresponding backhaul RLC channel (or a radio bearer) to be suspended, the parent IAB node can suspend the downlink transmission or retransmission for the backhaul RLC channel (or a radio bearer). If the indicated information is for instructing suspended downlink transmission or retransmission for a corresponding backhaul RLC channel (or a radio bearer) to be resumed, the parent IAB node can resume the downlink transmission or retransmission for the backhaul RLC channel (or a radio bearer). The indicated information may be included in a MAC CE. In this case, the MAC CE may include information for indicating suspension/resumption per RLC channel (or radio bearer). The MAC CE may include one or more of a backhaul RLC channel identifier for identifying a backhaul RLC channel (or a radio bearer), a UE-specific identifier for UE identification, a UE bearer identifier, a GTP TEID, a QoS identifier, a logical channel identifier and an adaptation layer header information. As another example, by configuring coded information associated with a backhaul RLC channel (or a radio bearer) through RRC signaling, the MAC CE may include information for indicating suspension/resumption per backhaul RLC channel (or a radio bearer). As another example, when failing in a relay delivery, a congestion status of a backhaul RLC channel (or a radio bearer) can be indicated through an adaptation data PDU or an adaptation control PDU. In this case, the adaptation data PDU or the adaptation control PDU may include information for identifying the backhaul RLC channel (or the radio bearer). The information for identifying may include one or more of a UE-specific identifier for UE identification, a UE bearer identifier, a QoS identifier, a logical channel identifier, a GTP TEID, and an adaptation layer header information, or include results from configuring coded information associated with a backhaul RLC channel (or a radio bearer) through RRC signaling.

As another example, when failing in a relay delivery, it is possible to indicate (e.g., buffer status information) a congestion status of a corresponding backhaul RLC channel (or a radio bearer) through a F1 user plane protocol header or a F1AP signaling message. In this case, the F1 user plane protocol header or the F1AP signaling message may include information for identification per RLC channel (or radio bearer). As another example, the F1 user plane protocol header or the F1AP signaling message may include one or more of a UE-specific identifier for UE identification, a UE bearer identifier, a QoS identifier, a logical channel identifier, a GTP TEID, and an adaptation layer header information, or include results from configuring coded information associated with a backhaul RLC channel (or a radio bearer) through RRC signaling.

The indication (e.g., buffer status information) of a congestion status of a backhaul RLC channel (or a radio bearer) described above may be delivered to a directly-connected parent IAB node hop by hop. As another example, the buffer status information for indicating of the congestion status may be delivered from an access IAB node accommodating a UE to a donor base station.

Although the embodiments are described based on downlink data transmission for convenience of the description. However, the embodiments are not limited thereto. The embodiments may be also equally applicable to uplink data transmission as described above. For example, the indication (e.g., buffer status information) of the congestion status of a backhaul RLC channel (or a radio bearer) described above may be delivered to a directly-connected child IAB node hop by hop, or be delivered from a donor base station to an access IAB node accommodating a UE.

Meanwhile, indication information for supporting operations of the embodiments described above may be configured by a donor base station (or a parent IAB node) in an IAB node (or a child IAB node) through higher layer (RRC) signaling. When the indication information for the embodiments described above is configured in the IAB node, this IAB node is able to operate according to the embodiments described above. For example, when detecting a relay delivery failure, the indication information may be information for instructing RLC status reporting to be triggered. As another example, when detecting a relay delivery failure, the indication information may be information for instructing a MAC CE, an RLC control PDU, or an adaptation control PDU to be triggered. As another example, the indication information may be information for indicating retransmission in response to a relay delivery failure. As another example, the indication information may include specific parameters (e.g., a count, a timer, a maximum retransmission threshold value, or the like) needed for corresponding operations. As another example, the indication information may be configured with individual information elements corresponded to respective information items, or configured with one information element. As another example, the indication information may be implicitly configured. For example, when a UE is configured as an IAB node or an IAB node operation is configured, the IAB node may support functions of the embodiments described above.

A Method of Configuring Trigger Condition Information for Triggering Feedback Information (e.g., Buffer Status Information) for Limiting Relay Delivery Failure in an IAB Node In the IAB network structure described above, a donor base station may perform adaptation for entire topology by hosting an RRC function, and total control for a radio resource control function for each UE and each IAB node. The topology adaptation is a procedure of reconfiguring a backhaul network without suspending a service for a UE when blockage or congestion occurs.

For example, a donor base station may indicate a radio resource configuration for a UE through RRC signaling. At this time, the donor base station configures the DU part (DU function) of an IAB node accommodating the UE (associated with the UE). To do this, the donor base station may transmit RRC information corresponding to a radio resource configuration of the UE through F1AP signaling (or signaling similar to that obtained by modifying the F1AP) between the CU of the donor base station and the DU part of the IAB node accommodating the UE.

As another example, a donor base station may indicate radio resource configuration for the MT of an IAB node through RRC signaling. At this time, in order to configure the DU part of a parent IAB node at a higher level accommodating the corresponding IAB node, the donor base station may transmit RRC information corresponding to the radio resource configuration of the IAB node through F1AP signaling (or signaling similar to that obtained by modifying the F1AP) between the CU of the donor base station and the DU part of the parent IAB node.

As described above, data may be lost when relay delivery fails in an IAB node while transmitting downlink data. As another example, although such data loss is expected, transmission may be performed unnecessarily.

To solve this problem, as described above, when congestion (or relay delivery failure) occurs in an IAB node, status information may be delivered to an IAB node at a higher level or a donor base station. When the status information is received, the IAB node at a higher level or the donor base station may control downlink data transmission for the corresponding IAB node (or a specific logical channel/logical channel group/radio bearer/backhaul RLC channel/QoS flow by which the congestion is caused in the corresponding IAB node). That is, the IAB node at a higher level or the donor base station may suspend, stop, interrupt, adjust, decrease, or control the downlink data. As another example, the donor base station may initiate a procedure/message/signaling for a path change/revision/modification/change/release for a specific logical channel/logical channel group/radio bearer/backhaul RLC channel/QoS flow by which the congestion is caused in the corresponding IAB node.

To do this, a corresponding IAB node in which the congestion (or relay delivery failure) has occurred may transmit, to a parent IAB node, a buffer status information message including one or more of corresponding IAB node identification information, a UE identifier that is configured in the corresponding IAB node and caused the congestion (or relay delivery failure), a logical channel/logical channel group/radio bearer/backhaul RLC channel/QoS flow identifier that is configured in the corresponding IAB node and caused the congestion (or relay delivery failure), a downlink expected/desired/wanted data rate for the corresponding IAB node/a UE in the corresponding IAB node/a radio bearer in the corresponding IAB node/a backhaul RLC channel/a QoS flow, a current/expected/desired/wanted buffer size for a radio bearer/backhaul RLC channel/QoS flow in the corresponding IAB node, whether a relay delivery failure has occurred, and cause information.

For example, the expected/desired/wanted data rate may represent an amount of data expected to be received in an amount of time. For example, the amount of time may be any positive number of seconds/slots/symbols (e.g. 1 second). For example, the expected/desired/wanted buffer size may represent an amount of data expected to be received in the amount of time. For example, the amount of time may be any positive number of seconds/slots/symbols (e.g. 1 second).

As another example, the expected/desired/wanted data rate may represent an amount of data to be received in a downlink L2 buffer. The expected/desired/wanted buffer size may represent an amount of data expected to be received in the downlink L2 buffer. Here, the expected/desired/wanted data rate or the expected/desired/wanted buffer size may be coded, and indicate congestion (delivery failure in the node, radio outage, or radio link failure) using a specific value for a corresponding information element.

For example, the buffer size may include at least one of RLC data PDUs, adaptation data SDUs, adaptation data PDUs, and adaptation control PDUs received (buffered) in the MT of an IAB node. Further, the buffer size may include at least one of RLC SDU, RLC SDU segments, RLC data PDUs, adaptation data SDUs, adaptation control PDUs, and adaptation data PDUs received (buffered) in the DU of an IAB node. As another example, the adaptation control PDUs received (buffered) in the DU of an IAB node is not transmitted to a lower downlink backhaul link. Thus, the adaptation control PDUs may not be included in the buffer size.

A message including the information (e.g., buffer status information) described above may be delivered to a directly-connected parent IAB node or child IAB. For example, the information described above may be provided by the defining of a higher layer message between IAB nodes. For example, the information may be transmitted through a UE context modification required message. As another example, the information may be transmitted through a message newly defined. As further another example, the information may be provided by newly defining the RLC control PDU, or by defining a new field in the RLC status PDU. As still another example, the information may be provided by defining an adaptation control PDU over an adaptation layer. As yet another example, the information may be transmitted through a MAC CE. As further still another example, the information may be transmitted by being included in a F1AP message or a F1 user plane protocol header.

Even though the methods described above can help cure a congestion status of each node, it may be difficult to effectively control entire radio resources under the donor base station. The donor base station is needed to recognize a congestion status of each IAB node or a congestion status for a logical channel/logical channel group/radio bearer/backhaul RLC channel/QoS flow configured in each IAB node.

To do this, in order for the donor base station to identify/manage congestion (or failure in a node) for the IAB node (or the DU of the IAB node or the MT of the IAB node), the donor base station may indicate condition information for status reporting of the IAB node (or the DU of the IAB node or the MT of the IAB node) to the IAB node. The condition information may be included in a F1AP (or signaling similar to that obtained by modifying the F1AP) message transmitted for configuring the DU of the IAB node. As another example, the condition information may be included in an RRC message transmitted for configuring the DU of the IAB node. As further another example, the condition information may be included in a F1AP (or signaling similar to that obtained by modifying the F1AP) message transmitted for configuring the MT of the IAB node. As still another example, the condition information may be included in an RRC message transmitted for configuring the MT of the IAB node.

Like this, the donor base station may transmit status reporting condition information needed to receive status reporting from an IAB node to the IAB node. As another example, the donor base station may request status reporting to an IAB node, and receive status information through a response message in response to this.

Condition information may include at least one of the following information items.
- a transmission period
- a buffer size (a threshold value) of the DU of the IAB node, or a buffer size (a threshold value) for each logical channel/logical channel group/radio bearer/backhaul RLC channel/QoS flow that is configured in the DU of the IAB node.
- a downlink data rate (a threshold value) of the DU of the IAB node, or a downlink data rate (a threshold value) for each logical channel/logical channel group/radio bearer/backhaul RLC channel/QoS flow that is configured in the DU of the IAB node.
- a congestion status in the DU of each IAB node, or a congestion/radio link failure/radio outage status for each logical channel/logical channel group/radio bearer/backhaul RLC channel/QoS flow that is configured in the DU of each IAB node.
- a reception buffer size (a threshold value) of the MT of each IAB node, or a reception buffer size (a threshold value) for each logical channel/logical channel group/radio bearer/backhaul RLC channel/QoS flow that is configured in the MT of each IAB node.
- a reception data rate (a threshold value) of the MT of each IAB node, or a reception data rate (a threshold value) for each logical channel/logical channel group/radio bearer/backhaul RLC channel/QoS flow that is configured in the MT of each IAB node.
- an expected/desired/wanted data rate (a threshold value) of the MT of each IAB node, or an expected/desired/wanted data rate (a threshold value) for each logical channel/logical channel group/radio bearer/backhaul RLC channel/QoS flow that is configured in the MT of each IAB node.
- a transmission period after a specific condition (e.g., congestion) has occurred.
- an identifier for identifying a corresponding condition Further, the condition information described above may be configured by being predefined. When the condition information is satisfied, status reporting maybe transmitted.

When a corresponding condition is configured and the condition is satisfied, the IAB node may deliver a message including status information (buffer status information) of the IAB node to a donor base station. For example, the status information may be transmitted by the MT of the IAB node to the donor base station through an RRC message. As another example, the status information may be transmitted by the IAB node (or the DU in the IAB node) to the donor base station through a F1AP (or signaling similar to that obtained by modifying the F1AP) message. As further another example, the status information may be transmitted through a UE context modification required message. As still another example, the status information may be transmitted through a message newly defined.

The status reporting message delivered by the IAB node to the donor base station may include at least one of the following information items.
- a reporting type
- a reporting satisfaction condition
- a condition identifier
- corresponding IAB node identification information
- an identifier of a UE for which a radio bearer is established in the IAB node
- a backhaul RLC channel identifier, a logical channel identifier
- a logical channel group identifier
- a buffer size of the DU of the IAB node, or each logical channel/logical channel group that is configured in the DU of the IAB node
- a buffer size for a radio bearer/backhaul RLC channel/QoS flow
- a downlink data rate of the DU of the IAB node, or a downlink data rate (a threshold value) for each logical channel/logical channel group/radio bearer/backhaul RLC channel/QoS flow that is configured in the DU of the IAB node.
- a downlink expected/desired/wanted data rate of the DU of the IAB node, or a downlink expected/desired/wanted data rate for each logical channel/logical channel group/radio bearer/backhaul RLC channel/QoS flow that is configured in the DU of the IAB node.
- a congestion status in the DU of each IAB node, or a congestion/radio link failure/radio outage status for each logical channel/logical channel group/radio bearer/backhaul RLC channel/QoS flow that is configured in the DU of each IAB node.
- a reception buffer size of the MT of each IAB node, or a reception buffer size for each logical channel/logical channel group/radio bearer/backhaul RLC channel/QoS flow that is configured in the MT of each IAB node.
- a reception data rate of the MT of each IAB node, or a reception data rate for each logical channel/logical channel group/radio bearer/backhaul RLC channel/QoS flow that is configured in the MT of each IAB node.
- an expected/desired/wanted data rate of the MT of each IAB node, or an expected/desired/wanted data rate for each logical channel/logical channel group/radio bearer/backhaul RLC channel/QoS flow that is configured in the MT of each IAB node.
- whether a relay delivery failure has occurred
- reporting cause information As another example, a corresponding status reporting message may include only an information element satisfying a condition/threshold value configured in the IAB node among information items described above. As another example, the status reporting message may include information elements by distinguishing an information element satisfying a condition and an information element not satisfying a condition.

For example, when a buffer size condition is configured, the status reporting message may include buffer sizes for each logical channel/logical channel group/radio bearer/backhaul RLC channel/QoS flow satisfying a condition among each logical channel/logical channel group/radio bearer/backhaul RLC channel/QoS flow that is configured in the DU of the IAB node. As another example, when a downlink data rate condition of the DU of the IAB node is configured, the status reporting message may include downlink data rate information for each logical channel/logical channel group/radio bearer/backhaul RLC channel/QoS flow satisfying a condition among each logical channel/logical channel group/radio bearer/backhaul RLC channel/QoS flow that is configured in the DU of the IAB node.

According to this, periodic reporting, congestion/buffer status reporting of an IAB node according to a specific condition, or periodic congestion/buffer status reporting of the IAB node based on a specific condition maybe performed. Accordingly, based on this, the donor base station is able to effectively perform topology adjustment and radio resource control by a radio bearer establishment/revision/modification/change etc.

As described above, the embodiments have been described by focusing on downlink transmission. However, the embodiments are not limited thereto. The embodiments maybe applicable to uplink transmission. Hereinafter, the embodiments will be described by focusing on the uplink transmission for ease of understanding.

Data may be lost when relay delivery fails or is expected to be failed in an IAB node when transmitting uplink data. As another example, even when data loss is expected, transmission or retransmission may be performed unnecessarily.

To solve this problem, when congestion (or relay delivery failure) occurs or is expected in an IAB node, status information for informing the congestion maybe delivered to an IAB node at a higher level or a donor base station. When the status information is received, the IAB node at a higher level or the donor base station may suspend/stop/interrupt/adjust/decreasingly control uplink data resource assignment for the corresponding IAB node (or a specific logical channel/logical channel group/radio bearer/backhaul RLC channel/QoS flow by which the congestion is caused in the corresponding IAB node). As another example, the donor base station may initiate a procedure/message/signaling for a path change/revision/modification/change/release for a specific logical channel/logical channel group/radio bearer/backhaul RLC channel/QoS flow by which the congestion is caused in the corresponding IAB node.

To do this, an IAB node in which the congestion (or relay delivery failure) has occurred or has been expected may transmit, to a parent IAB node, status information including the following information items.

IAB node identification information a UE identifier that is configured in the IAB node and caused the congestion (or relay delivery failure)

a logical channel/logical channel group/radio bearer/backhaul RLC channel/QoS flow identifier that is configured in the corresponding IAB node and caused the congestion (or relay delivery failure)

an uplink expected/desired/wanted data rate for the IAB node/a UE in the IAB node/a radio bearer in the IAB node/a backhaul RLC channel/a QoS flow an uplink current/expected/desired/wanted buffer size for a radio bearer/backhaul RLC channel/QoS flow in the IAB node whether a relay delivery failure has occurred cause information The expected/desired/wanted data rate represents an amount of data expected to be received in an amount of time. The amount of time may be any positive number of seconds/slots/symbols (e.g. 1 second). The current buffer size represents a value calculated through a data volume calculation operation after MAC PDU has been constructed. The expected/desired/wanted buffer size represents an amount of data expected to be received in the amount of time. The amount of time may be any positive number of seconds/slots/symbols (e.g. 1 second).

As another example, the expected/desired/wanted data rate may represent an amount of data to be transmitted in an uplink L2 buffer. The expected/desired/wanted buffer size may represent an amount of data expected to be transmitted in the uplink L2 buffer. Here, the expected/desired/wanted data rate or the expected/desired/wanted buffer size may be coded, and indicate congestion (delivery failure in the node, radio outage, or radio link failure) using a specific value for a corresponding information element.

The buffer size may include at least one of RLC data PDUs (RLC data PDUs that are pending for initial transmission, RLC data PDUs that are pending for retransmission) to be transmitted or buffered in the MT in an IAB node, RLC SDUs and RLC SDU segments (RLC SDUs and RLC SDU segments that have not yet been included in an RLC data PDU) to be transmitted or buffered in the MT in the IAB node, adaptation data PDUs and adaptation control PDUs to be transmitted or buffered in the MT in the IAB node, RLC data PDUs received/buffered in the DU in the IAB node, adaptation data PDUs and adaptation control PDUs received/buffered in the DU in the IAB node.

As another example, the adaptation control PDUs received/buffered in the DU of an IAB node is not transmitted to a higher uplink backhaul link. Thus, the adaptation control PDUs may not be included in the buffer size.

Buffer sizes of the DU and the MT of an IAB node IAB may be added and reported through one field. As another example, buffer sizes of the DU and the MT may be distinguished from each other, and reported through different fields.

Additionally, the buffer size may be calculated by adding one or more buffer size(s) included in Buffer Status Report (BSR) received from a child IAB node. As another example, the buffer size may be calculated by adding one or more buffer size(s) included in BSR received from a child IAB node within n hop(s) (n=0 or a positive integer). At this time, the one or more buffer size(s) may be added through mapping information between a backhaul RLC channel of the child IAB node and a backhaul RLC channel of a parent IAB node. As another example, the buffer size may be provided as information for distinguishing a buffer size received through the BSR of a child IAB node from a buffer size field of a corresponding IAB node.

The status information described above may be delivered to a directly-connected parent IAB node or child IAB node.

For example, the status information described above may be transmitted by newly defining a higher layer message between IAB nodes. For example, the status information may be transmitted through a UE context modification required message. As another example, the status information may be transmitted by being included in a new message separately defined.

As another example, the status information may be provided by newly defining the RLC control PDU, or by defining a new field in the RLC status PDU. As further another example, the status information may be provided by defining an adaptation control PDU over an adaptation layer. As still another example, the status information may be transmitted through a MAC CE. For example, buffer status may be transmitted through an identity of logical channel (LCID, e.g., 59~62) identical to the typical NR BSR, or transmitted by newly defining a LCID different from the typical BSR. If the BSR is used, a data reception condition of the DU in an IAB node or an associated BSR reception condition may be added to a BSR trigger condition in a MAC entity of the MT of the IAB node. When a condition is satisfied, the MAC entity may consider uplink data to be available for one or more logical channels included in a logical channel group. At this time, the logical channel(s)/logical channel group maybe associated through mapping information between a backhaul RLC channel of the child IAB node and a backhaul RLC channel of a parent IAB node.

Even though the methods described above help cure a congestion status of each node, it may be difficult to effectively control entire radio resources under the donor base station. The donor base station is needed to recognize an expected congestion status of each IAB node or an expected congestion status for a logical channel/logical channel group/radio bearer/backhaul RLC channel/QoS flow configured in each IAB node.

To do this, in order for the donor base station to identify/manage an expected congestion status (or transmission failure) for the IAB node (or the DU of the IAB node or the MT of the IAB node), the donor base station may indicate a status information trigger condition of the IAB node (or the DU of the IAB node or the MT of the IAB node) to the IAB node. For example, the trigger condition may be included in a F1AP (or signaling similar to that obtained by modifying the F1AP) message transmitted for configuring the DU of the IAB node. As another example, the trigger condition may be included in an RRC message transmitted for configuring the DU of the IAB node. As another example, the trigger condition may be included in a F1AP (or signaling similar to that obtained by modifying the F1AP) message transmitted for configuring the MT of the IAB node. As another example, the trigger condition may be included in an RRC message transmitted for configuring the MT of the IAB node.

Like this, in order for the donor base station to receive status reporting from the IAB node, a condition to trigger the reporting of the corresponding IAB node may be configured. As another example, the donor base station may request the reporting to the IAB node, and receive status reporting through a response in response to this.

The condition information (trigger condition) described above may include at least one of the following information items.
- a transmission period
- a buffer size (a threshold value) of the DU of the IAB node, or a buffer size (a threshold value) for each logical channel/logical channel group/radio bearer/backhaul RLC channel/QoS flow that is configured in the DU of the IAB node.
- an uplink data rate (a threshold value) of the DU of the IAB node, or an uplink data rate (a threshold value) for each logical channel/logical channel group/radio bearer/backhaul RLC channel/QoS flow that is configured in the DU of the IAB node.
- a congestion status in the DU of each IAB node, or a congestion/radio link failure/radio outage status for each logical channel/logical channel group/radio bearer/backhaul RLC channel/QoS flow that is configured in the DU of each IAB node.
- a transmission buffer size (a threshold value) of the MT of each IAB node, or a transmission buffer size (a threshold value) for each logical channel/logical channel group/radio bearer/backhaul RLC channel/QoS flow that is configured in the MT of each IAB node.
- a transmission data rate (a threshold value) of the MT of each IAB node, or a transmission data rate (a threshold value) for each logical channel/logical channel group/radio bearer/backhaul RLC channel/QoS flow that is configured in the MT of each IAB node.
- an expected/desired/wanted data rate (a threshold value) of the MT of each IAB node, or an expected/desired/wanted data rate (a threshold value) for each logical channel/logical channel group/radio bearer/backhaul RLC channel/QoS flow that is configured in the MT of each IAB node.
- a transmission period after a specific condition (e.g., congestion) has occurred.
- an identifier for identifying a corresponding condition Further, at least one of the condition information items described above may be defined/configured in the IAB node in advance. When a corresponding condition is satisfied, a child IAB node can perform reporting to a parent IAB node or a donor base station.

When a corresponding condition is configured and the condition is satisfied, the IAB node may deliver a message including information related to at least one of congestion and a buffer status of the IAB node to the donor base station. For example, the MT of the IAB node may transmit the information to the donor base station through an RRC message. As another example, the information may be transmitted by the IAB node (or the DU of the IAB node) to the donor base station through a F1AP (or signaling similar to that obtained by modifying the F1AP) message. For example, the information may be transmitted through a UE context modification required message. As another example, the information may be transmitted through a message newly defined.

The message delivered by the IAB node to the donor base station may include at least one of the following information items.
- a reporting type
- a reporting satisfaction condition
- a condition identifier
- corresponding IAB node identification information
- an identifier of a UE for which a radio bearer is established in the IAB node
- a backhaul RLC channel identifier
- a logical channel identifier
- a logical channel group identifier
- a buffer size of the DU of the IAB node, or a buffer size for each logical channel/logical channel group/radio bearer/backhaul RLC channel/QoS flow that is configured in the DU of the IAB node.
- an uplink data rate of the DU of the IAB node, or an uplink data rate for each logical channel/logical channel group/radio bearer/backhaul RLC channel/QoS flow that is configured in the DU of the IAB node.
- an uplink expected/desired/wanted data rate of the DU of the IAB node, or an uplink expected/desired/wanted data rate for each logical channel/logical channel group/radio bearer/backhaul RLC channel/QoS flow that is configured in the DU of the IAB node.
- a congestion status in the DU of each IAB node, or a congestion/radio link failure/radio outage status for each logical channel/logical channel group/radio bearer/backhaul RLC channel/QoS flow that is configured in the DU of each IAB node.
- a transmission buffer size of the MT of each IAB node, or a transmission buffer size for each logical channel/logical channel group/radio bearer/backhaul RLC channel/QoS flow that is configured in the MT of each IAB node.
- a transmission data rate of the MT of each IAB node, or a transmission data rate for each logical channel/logical channel group/radio bearer/backhaul RLC channel/QoS flow that is configured in the MT of each IAB node.
- an expected/desired/wanted data rate of the MT of each IAB node, or an expected/desired/wanted data rate for each logical channel/logical channel group/radio bearer/backhaul RLC channel/QoS flow that is configured in the MT of each IAB node, whether a relay delivery failure has occurred
- reporting cause information The message described above may include only an information element satisfying a condition/a threshold value configured in the IAB node among information items described above. As another example, the message may include information elements by distinguishing an information element satisfying a condition/threshold value and an information element not satisfying a condition/threshold value. For example, when a buffer size condition is configured, the status information transmission message may include buffer size information for each logical channel/logical channel group/radio bearer/backhaul RLC channel/QoS flow satisfying a condition among each logical channel/logical channel group/radio bearer/backhaul RLC channel/QoS flow that is configured in the DU of the IAB node. As another example, when an uplink data rate condition of the DU of the IAB node is configured, the status information transmission message may include uplink data rate information for each logical channel/logical channel group/radio bearer/backhaul RLC channel/QoS flow satisfying a condition among each logical channel/logical channel group/radio bearer/backhaul RLC channel/QoS flow that is configured in the DU of the IAB node.

According to this, periodic reporting, congestion/buffer status reporting of the IAB node according to a specific condition, or periodic congestion/buffer status reporting of the IAB node based on a specific condition can be performed. Accordingly, based on this, the donor base station is able to effectively perform topology adjustment and radio resource control by a radio bearer establishment/revision/modification/change etc.

As described above, in accordance with the embodiments of the present disclosure, in the layer 2-based multi-hop relay structure, it is possible to prevent congestion from occurring over a relay node or effectively control a data retransmission operation when congestion occurs.

Hereinafter, hardware and software configurations of the IAB node and the donor base station capable of performing the embodiments described above will be described with reference to accompanying drawings.

Figure 16:
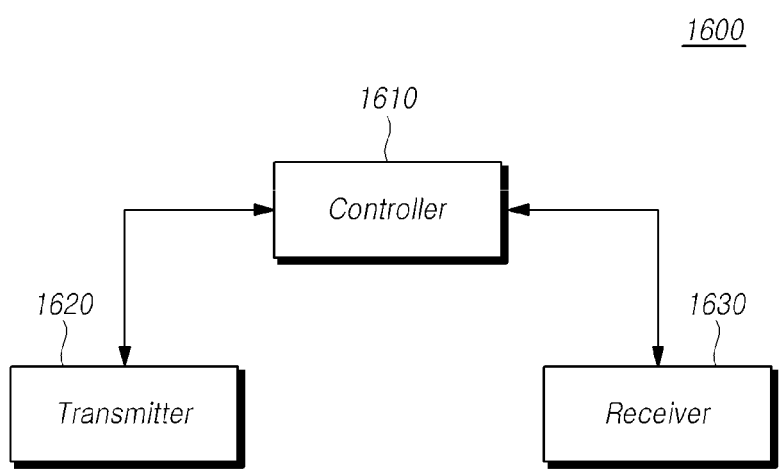
FIG. 16 is a block diagram illustrating the configuration of the IAB node according to embodiments of the present disclosure.

FIG. 16 is a block diagram illustrating the IAB node according to embodiments of the present disclosure.

Referring to FIG. 16, the IAB node 1600 includes a receiver 1630 receiving IAB node configuration information including information for configuring a mobile-termination (MT) function and a distribute unit function of the IAB node from a donor base station, a controller 1610 monitoring an uplink buffer status or a downlink buffer status in the IAB node, and a transmitter 1620 transmitting uplink buffer status information or downlink buffer status information to the donor base station or an associated parent IAB node based on the result of the monitoring for the uplink buffer status or the downlink buffer status.

The controller 1610 establishes DU and MT functions (configurations) in the IAB node. To do this, the receiver 1630 may receive the IAB node configuration information from the donor base station. The IAB node configuration information may include parameter information used to configure the associated DU and MT. Further, the IAB node configuration information may include parent IAB node information or donor base station information associated with the IAB node. As another example, the IAB node configuration information may include at least one of trigger condition information for triggering the transmission of downlink buffer status information or uplink buffer status information, information for indicating a trigger, and signaling information used to transmit buffer status information. For example, the trigger condition information may include buffer threshold value information or associated timer information for transmitting a buffer status report.

By establishing the DU and MT functions after receiving the IAB node configuration information, the controller 1610 causes the IAB node to be established in a relay node. Further, the controller 1610 monitors a downlink data or uplink data processing status.

For example, the controller 1610 monitors a status of the downlink buffer while processing downlink data. That is, the controller 1610 monitors whether data buffered in the downlink buffer exceed a threshold value set for buffer status information transmission, whether the data buffered in the downlink buffer satisfy a trigger condition for the buffer status information transmission, or the like. As another example, the controller 1610 may monitor whether downlink data are lost while the data are delivered from the MT to the DU of the IAB node. Here, the buffer that the controller 1610 monitors may be at least one of a downlink buffer configured in the MT and a downlink buffer configured in the DU.

As another example, the controller 1610 monitors a status of the uplink buffer while processing uplink data. That is, the controller 1610 monitors whether data buffered in the uplink buffer exceed a threshold value set for buffer status information transmission, whether the data buffered in the uplink buffer satisfy a trigger condition for the buffer status information transmission, or the like. As another example, the controller 1610 may monitor whether uplink data are lost while the data are delivered from the DU to the MT of the IAB node. Here, the buffer that the controller 1610 monitors may be at least one of an uplink buffer configured in the MT and an uplink buffer configured in the DU.

The IAB node 1600 may configure respective buffers in the MT and the DU for each of uplink and downlink. As another example, the IAB node 1600 may configure a single buffer by integrating buffers in the MT and the DU. When the IAB node 1600 configures a single buffer, the controller 1610 may monitor only the corresponding buffer. Unlike this, the IAB node 1600 configures respective buffers in the MT and the DU, the controller 1610 monitors the respective buffers. Data loss in the IAB node 1600 means that the data are discarded which the data are delivered from the DU to MT or from the MT to the DU. Or the data loss means that data are lost due to a buffer overflow, Meanwhile, when the result of the monitoring for the buffer status satisfies a buffer status information transmission trigger condition, the IAB node 1600 transmits buffer status information.

For example, when downlink data are lost in the IAB node, the transmitter 1620 may transmit downlink buffer status information to the donor base station or the associated parent IAB node. For example, the transmitter 1620 may transmit the downlink buffer status information to the associated parent IAB node by including the downlink buffer status information in a MAC control element (MAC CE) or a backhaul adaptation protocol (BAP) control PDU. As another example, the transmitter 1620 may transmit the downlink buffer status information to the donor base station by including the downlink buffer status information in a F1 user plane protocol header or a F1AP message. That is, the IAB node delivers the downlink buffer status information to an entity in a higher level using a different message depending on an entity receiving the downlink buffer status information.

As another example, when uplink data are lost in an IAB node, the transmitter 1620 may transmit uplink buffer status information to an associated parent IAB node. For example, the transmitter 1620 may transmit the uplink buffer status information to the associated parent IAB node by including the uplink buffer status information in a MAC control element (MAC CE) or a backhaul adaptation protocol (BAP) control PDU. As another example, the transmitter 1620 may transmit the uplink buffer status information to the donor base station by including the uplink buffer status information in a F1 user plane protocol header or a F1AP message. As another example, the IAB node 1600 may deliver the uplink buffer status information to a child IAB node configured in a lower level. In this case, the uplink buffer status information may be included in a MAC control element (MAC CE) or a backhaul adaptation protocol (BAP) control PDU.

Meanwhile, the uplink buffer status information or downlink buffer status information may include at least one of buffer size information, IAB node identifier information, backhaul RLC channel identifier information, UE bearer identifier information and logical channel group identifier information.

In addition, the controller 1610 controls overall operations of the IAB node 1600 required to perform operations for preventing data loss in the IAB node required to perform the embodiments described above.

The transmitter 1620 and the receiver 1630 are used to transmit or receive signals, messages, data required to perform the embodiments described above to or from another IAB node, a donor base station, or a UE.

Figure 17:
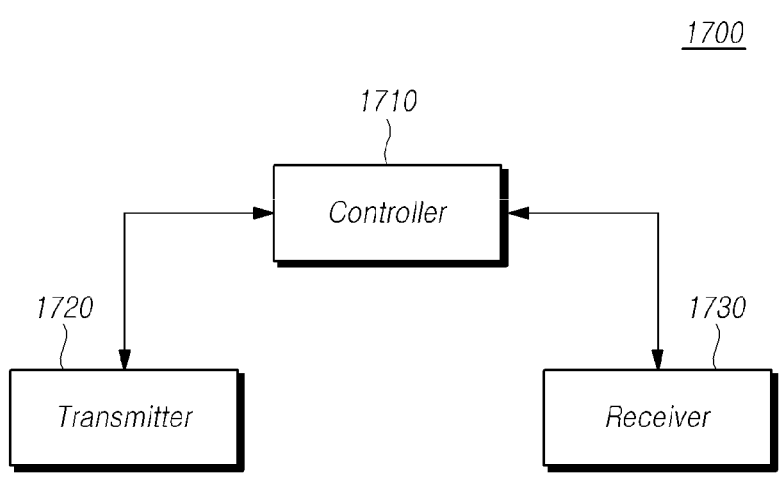
FIG. 17 is a block diagram illustrating the configuration of the donor base station according to embodiments of the present disclosure.

FIG. 17 is a block diagram illustrating the donor base station according to embodiments of the present disclosure.

Referring to FIG. 17, the donor base station 1700 includes a transmitter 1720 transmitting, to an IAB node, IAB node configuration information including information for configuring a mobile-termination (MT) function and a distribute unit function of the IAB node, and when a buffer status information transmission is triggered in the IAB node, a receiver receiving 1730 a F1 user plane protocol header or a F1AP message including downlink buffer status information of the IAB node.

The donor base station 1700 may establish an IAB network and establish IAB nodes in the IAB network. To do this, the transmitter 1720 may transmit the IAB node configuration information for configuring the DU and the MT of the IAB node to the IAB node.

For example, the IAB node configuration information may include parameter information used to configure the associated DU and MT. Further, the IAB node configuration information may include parent IAB node information or donor base station information associated with the IAB node. As another example, the IAB node configuration information may include at least one of trigger condition information for triggering the transmission of downlink buffer status information or uplink buffer status information, information for indicating a trigger, and signaling information used to transmit buffer status information. For example, the trigger condition information may include buffer threshold value information or associated timer information for transmitting a buffer status report.

The IAB node may determine whether to trigger the transmission of the buffer status information through operations according to the various embodiments described above.

For example, the downlink buffer status information may include at least one of buffer size information, IAB node identifier information, backhaul RLC channel identifier information, UE bearer identifier information and logical channel group identifier information.

For example, the buffer size information may be made up of information obtained by adding buffer size information configured in the mobile-termination (MT) and buffer size information configured in the distribution unit (DU) of the corresponding IAB node. As another example, the buffer size information may distinguishably include buffer size information configured in the mobile-termination (MT) of the IAB node and buffer size information configured in the distribution unit (DU) of the IAB node. That is, the buffer size information configured in the mobile-termination (MT) and the buffer size information configured in the distribution unit (DU) are distinguished from each other, and then included in the buffer size information.

In addition, when the buffer status information transmission is triggered in the IAB node, the receiver 1730 may receive an F1 user plane protocol header or an F1AP message including uplink buffer status information of the IAB node.

Through these operations, the donor base station 1700 is able to recognize information on a buffer status of the IAB node. Accordingly, when transmitting downlink data, it is possible to check the presence or absence of data loss, or a possibility of data loss in an IAB node. In the case of uplink data, it is possible to check a possibility of data loss according to loss in an IAB node.

In addition, the controller 1710 controls overall operations of the donor base station 1700 required to perform operations for preventing data loss in the IAB node required to perform the embodiment described above.

The transmitter 1720 and the receiver 1730 are used to transmit or receive signals, messages, data required to perform the embodiments described above to or from an IAB node, or a UE.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer.

For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method of an integrated access and backhaul (IAB) node for processing data, the method comprising:
configuring a mobile-termination (MT) function and a distribute unit (DU) function of the IAB node;
monitoring an uplink buffer status or a downlink buffer status in the IAB node; and
transmitting downlink buffer status information or uplink buffer status information to a donor base station or an associated parent IAB node based on a result of the monitoring for the uplink buffer status or the downlink buffer status,
wherein the uplink buffer status information or the downlink buffer status information is transmitted to the associated parent IAB node by being included in a backhaul adaptation protocol (BAP) control protocol data unit (PDU),
wherein the downlink buffer status information includes buffer size information per backhaul radio link control (RLC) channel identifier information,
wherein the uplink buffer status information transmitted to the associated parent IAB node includes expected buffer size information distinguished from a buffer size of the IAB node, and the expected buffer size information is information on an amount of data expected to arrive at the IAB node in a predetermined amount of time, from a child IAB node associated with the IAB node, and
wherein the uplink buffer status information including the expected buffer size information is transmitted through a medium access control (MAC) control element (MAC CE) having logical channel identification information different from the uplink buffer status information not including expected buffer size information,
wherein when the IAB node received uplink user data, the IAB node selects the backhaul RLC channel for transmitting the uplink user data based on donor base station address information, and
wherein the transmission of the uplink buffer status information transmitted to the associated parent IAB node is triggered even when a buffer status report from a child IAB node associated with the IAB node is received,
wherein the logical channel identification information for the uplink buffer status information including the expected buffer size information is set to a value different from 59 to 62 used in the uplink buffer status information that does not include the expected buffer size information.

2. An integrated access and backhaul (IAB) node processing data comprising:
a controller configured to configure a mobile-termination (MT) function and a distribute unit (DU) function of the TAB node and monitor an uplink buffer status or a downlink buffer status in the TAB node; and
a transmitter configured to transmit downlink buffer status information or uplink buffer status information to a donor base station or an associated parent TAB node based on a result of the monitoring for the uplink buffer status or the downlink buffer status,
wherein the uplink buffer status information or the downlink buffer status information is transmitted to the associated parent TAB node by being included in a backhaul adaptation protocol (BAP) control protocol data unit (PDU),
wherein the downlink buffer status information includes buffer size information per backhaul radio link control (RLC) channel identifier information
wherein the uplink buffer status information transmitted to the associated parent TAB node includes expected buffer size information distinguished from a buffer size of the TAB node, and the expected buffer size information is information on an amount of data expected to arrive in a predetermined amount of time at the TAB node from a child TAB node associated with the TAB node, and
wherein the uplink buffer status information including the expected buffer size information is transmitted through a medium access control (MAC) control element (MAC CE) having logical channel identification information different from the uplink buffer status information not including expected buffer size information,
wherein when the TAB node received uplink user data, the controller selects the backhaul RLC channel for transmitting the uplink user data based on donor base station address information, and
wherein the transmission of the uplink buffer status information transmitted to the associated parent IAB node is triggered even when a buffer status report from a child IAB node associated with the IAB node is received,
wherein the logical channel identification information for the uplink buffer status information including the expected buffer size information is set to a value different from 59 to 62 used in the uplink buffer status information that does not include the expected buffer size information.

* * * * *

UNITED STATES PATENT AND TRADEMARK OFFICE
CERTIFICATE OF CORRECTION

PATENT NO. : 11,910,230 B2
APPLICATION NO. : 17/051023
DATED : February 20, 2024
INVENTOR(S) : Sung-pyo Hong It is certified that error appears in the above-identified patent and that said Letters Patent is hereby corrected as shown below:

In the Claims

In Claim 2, Column 40, Lines 15, 16, 19, 24, 31, 33, 35, 36 (twice), 44, please replace "TAB" with --IAB--.

Signed and Sealed this
Nineteenth Day of March, 2024

Katherine Kelly Vidal
*Director of the United States Patent and Trademark Office*